United States Patent [19]

Baker et al.

[11] Patent Number: 4,977,502

[45] Date of Patent: Dec. 11, 1990

[54] TRANSIT VEHICLE FAREBOX FOR CONDUCTING MULTI-MEDIA TRANSIT FARE TRANSACTIONS

[76] Inventors: Joseph R. Baker, San Diego; Wesley A. Golland, La Jolla; Paul A. Mullens; Roger B. Trimble, both of San Diego; Charles W. Giebelhausen, all of Calif.

[21] Appl. No.: 114,565

[22] Filed: Oct. 29, 1987

Related U.S. Application Data

[63] Continuation of Ser. No. 750,534, Jun. 28, 1985.

[51] Int. Cl.[5] .................... G06F 15/21

[52] U.S. Cl. .................... 364/405; 235/384; 232/7

[58] Field of Search .................... 364/405, 407; 235/384; 272/7, 12, 15

[56] References Cited

U.S. PATENT DOCUMENTS

| | | | |
|---|---|---|---|
| 3,108,741 | 10/1963 | Thomas | 232/15 |
| 3,748,441 | 7/1973 | Halpern | 235/384 |
| 3,841,550 | 10/1974 | Kaneda | 232/15 |
| 3,926,019 | 12/1975 | Mazeika | 232/12 |
| 3,984,660 | 10/1976 | Oka | 235/384 |
| 4,372,478 | 2/1983 | Gomez | 232/12 |
| 4,449,186 | 5/1984 | Kelly | 364/407 |
| 4,471,905 | 9/1984 | Sloma | 232/12 |
| 4,488,035 | 12/1984 | Withnall | 235/384 |

FOREIGN PATENT DOCUMENTS

| | | |
|---|---|---|
| 0010399 | 10/1979 | European Pat. Off. . |
| 142473 | 8/1983 | Japan . |
| 1384311 | 4/1972 | United Kingdom . |
| 1371062 | 10/1974 | United Kingdom . |
| 2114346 | 7/1985 | United Kingdom . |

OTHER PUBLICATIONS

"Operation and Maintenance Manual for Automatic Fare Collection System Gates, vol. 1, Bay Area Rapid Transit District (BART) Contract No. 2Z4799," by Cubic Western Data, COM FHB/916-1, 20 Dec. 1977, pp. 1-21 to 1-32 and 2-5 to 2-10.

"Operation and Maintenance Manual for Automatic Fare Collection System Addfare Machine, vol. 1, Bay Area Rapid transit District (BART) Contact No. 2Z4799," by Cubic Western Data, COM FHB/916-3, 28 Dec. 1977, pp. 1-7, 1-8, 1-11 to 1-18, 2-3, 2-29 to 2-62, and 2-87 to 2-90.

*Primary Examiner*—Michael R. Fleming
*Assistant Examiner*—Gail O. Hayes
*Attorney, Agent, or Firm*—Brown, Martin, Haller & McClain

[57] ABSTRACT

A bus farebox that conducts transit fare transactions accepts magnetically-encoded farecards, currency bills or tickets, or coins or tokens tendered for fare. Fare processing is conducted on the basis of a selected one of a set of fare tables electrically stored in the farebox. The farebox has provision for accumulating audit information based upon a plurality of fare transactions. The accumulated audit data and a cashbox are released from the farebox in response to commands received by the farebox from a communication system located at a bus terminal station.

19 Claims, 12 Drawing Sheets

TRANSIT VEHICLE FAREBOX FOR CONDUCTING MULTI-MEDIA TRANSIT FARE TRANSACTIONS

This is a continuation of application Ser. No. 750,534 filed June 28, 1985.

CROSS REFERENCE TO RELATED U.S. PATENT APPLICATIONS

"AUTOMATED SYSTEM FOR CONDUCTING TRANSIT FARE TRANSACTIONS"; Ser. No. 562,440; Filed: Dec. 15, 1983; Inventors: John E. Cain et al abandoned.

"SECURITY VAULT SYSTEM"; Ser. No. 742,295; Filed: June 7, 1985; Inventors: Ronald L. Hempfling et al abandoned.

"COIN DISCRIMINATOR"; Ser. No. 739,869; Filed: May 31, 1985; Inventor: Billy B. Winkles abandoned.

BACKGROUND OF THE INVENTION

The present invention relates broadly to fareboxes, and more specifically to a farebox that conducts transit fare transactions in response to fares tendered in at least three different fare media.

The ability of prior art automatic fareboxes to conduct transit fare transactions is limited. Most such prior art fareboxes are capable only of counting coins and bills tendered for fare. Such fareboxes detect coins or bills for the purpose of registering a fare payment during a fare transaction with a passenger. Further, such fareboxes do not have the ability to conduct even limited fare transactions with fare media other than bills and coins The present invention solves the problem of conducting fare transactions based on any one of a plurality of fare media.

SUMMARY OF THE INVENTION

The farebox of this invention automatically conducts transit fare transactions in which any one of a plurality of fare payment media may be tendered for payment of a fare. The farebox includes a housing having an aperture for receiving paper payment media and an aperture for receiving coin payment media. A bill/ticket module feeds a paper bill or ticket having a predetermined length corresponding to a predetermined fare from the paper media aperture to a bill collection point within the farebox housing while detecting the predetermined length. A coin module feeds a coin having a predetermined denomination from the coin aperture to a coin collection point while detecting the denomination of the coin. A farecard module mounted on the housing receives fare media bearing encoded data signals while detecting predetermined fare information in the data signals.

The bill module, the coin module, and the farecard module are all connected to a fare processor which registers payment of a predetermined fare based upon a detected bill length, a detected coin denomination, or detected fare information.

A portable cashbox is removably held in the farebox housing adjacent the bill and coin collection points for securely receiving coins and bills from the bill module and the coin module.

Accordingly, it is a principal object of the present invention to provide a farebox capable of conducting fare transactions based upon fare payment by any one of a plurality of fare payment media, including bills, coins, and signal-encoded cards.

An advantage provided by the farebox of the invention is the reduction of operator time necessary to conduct and monitor fare transactions.

Still other objects and advantages of the present invention will become more apparent when the invention's detailed description is read in conjunction with the below-described drawings.

DETAILED DESCRIPTION OF THE PREFERRED EMBODIMENT

Figure 1:
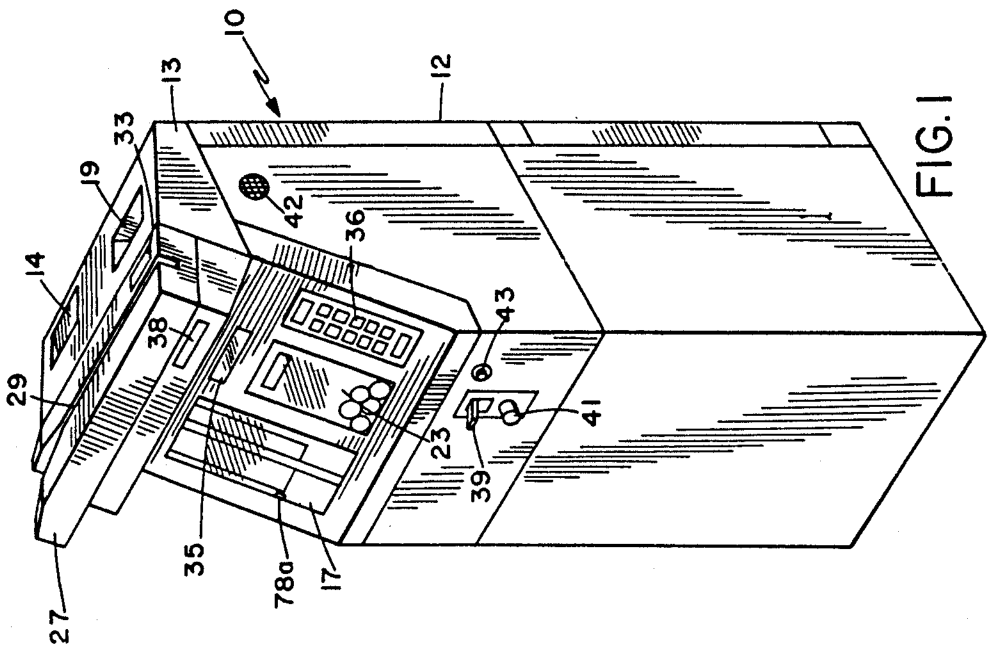
FIG. 1 is a perspective view of the farebox of the invention from the point of view of a farebox operator.

Referring to FIG. 1 there is shown the farebox of the invention, indicated generally by 10, from the perspective of a farebox operator. It is contemplated that the farebox 10 would be used, for example, on a bus in an urban mass transportation system for conducting transit fare transactions with passengers upon their entering the bus. Thus, the farebox 10 would be located immediately adjacent the bus driver at the point of entry of passengers into the bus. The driver, in addition to operating the bus, controls and monitors the operation of the farebox 10.

Generally, each fare transaction conducted by the farebox 10 will involve the receipt by the farebox 10 of a payment by a passenger for riding the bus. Such payment can be made by any one of a plurality of fare payment media. In the preferred embodiment, fare payment media that are accepted by the farebox 10 during the processing of fare transactions include currency in the form of bills, tickets having predetermined lengths, with each length corresponding to a prepaid fare, coins, tokens, and farecards bearing magnetically-encoded signals in a strip of magnetic material. Other forms of fare payment that are acceptable to the farebox 10 are prepaid passes or prepaid transfers.

A fare transaction is initiated by a passenger upon entering the bus by tendering a fare payment medium to the farebox.

In conducting a fare transaction the farebox 10 has the ability to respond to the provision of bills, tickets, coins, tokens, or farecards by passengers and to register fare payment. The farebox's ability to register fare payment includes the ability to determine from the medium tendered the amount of the tender and to decide whether the amount tendered equals or exceeds a predetermined fare tariff. If the amount tendered is sufficient to pay the fare, the farebox acknowledges and records payment.

Figure 2:
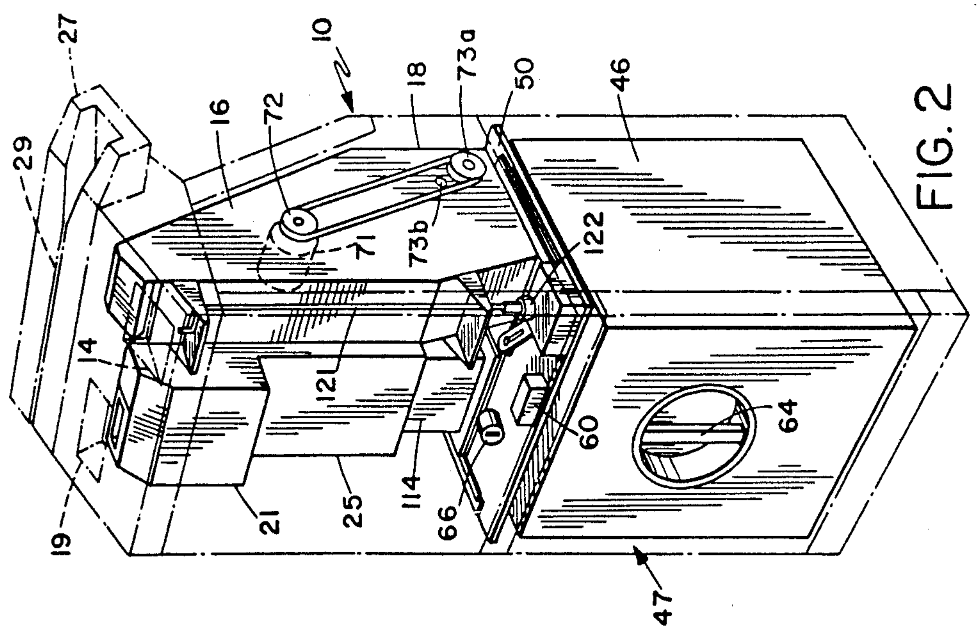
FIG. 2 is another perspective view of the farebox of the invention showing the farebox housing in broken line and showing, in solid line, critical components of the farebox that are contained within the housing.

Refer now to FIG. 1 and FIG. 2. FIG. 2 illustrates the farebox 10 from the perspective of a passenger entering a bus. The farebox housing 12 includes an upper portion 13 having an inclined aperture 14 for accepting currency bills and tickets. The bills and tickets inserted into the aperture 14 by a passenger are transported one at a time by a bill feeder and detector module (bill module) 16 from the aperture 14 to an escrow window 17 visible to the driver. From the escrow window 17, the bill module 16 feeds bills along a path of travel 18 which carries bills and tickets further into the interior of the housing 12.

A coin acceptor aperture 19 is located in the upper housing portion 13 through which coins and tokens are fed by a bus passenger into a coin singulator and discriminator module (coin module) 21. Coins and tokens are fed through the coin module 21 to a coin escrow window 23 that is visible to the bus driver. From the escrow window 23, coins and tokens are carried by a coin chute 25 further into the interior of the farebox 10.

A magnetic fare card reader 27 is fastened to the upper housing portion 13 and includes a reader slot 29 through which a farecard having magnetically-encoded fare data is manually swiped by a passenger who retains physical control of the farecard during its travel through the slot 29.

A passenger value alphanumeric display 33 is positioned on the magnetic farecard reader 27 where it is visible to a passenger. A driver/operator value alphanumeric display 35 is located on the driver's side of the farebox where it is visible to the driver alone. An alphanumeric entry keyboard 36 is also located on the driver's side of the farebox 10 adjacent the coin escrow window 23 and the driver value display 35. A driver/operator status display 38 is positioned on the side of the magnetic farecard reader 27 that is visible only to the driver.

Other controls available to the driver and located on the driver's side of the farebox 10 include a manual coin dump lever 39 and an override/bypass lever 41. Finally, a speaker 42 is located on one side of the farebox where it emits tones and predetermined voice messages that are audible to both the driver and a passenger.

A cashbox 46 is securely held in a chamber 47 in the lower portion of the farebox 10. In the farebox and above the cashbox 46 is located a security plate 50 separating the upper portion of the farebox containing the bill and coin modules 16 and 21 and the lower chamber 47 containing the cashbox 46. An electronic lock 60 is securely mounted to the inside of the housing over the security plate 50 immediately above the top of the cashbox 46. A manually-operated lock handle 64 is located on the front of the cashbox 46. On the wall of the farebox 10 that faces a passenger is located a receptacle 66 for receiving a station communications probe (not shown) that is used when the bus is delivered to a bus terminal for removal of the cash box 46.

Figure 3:
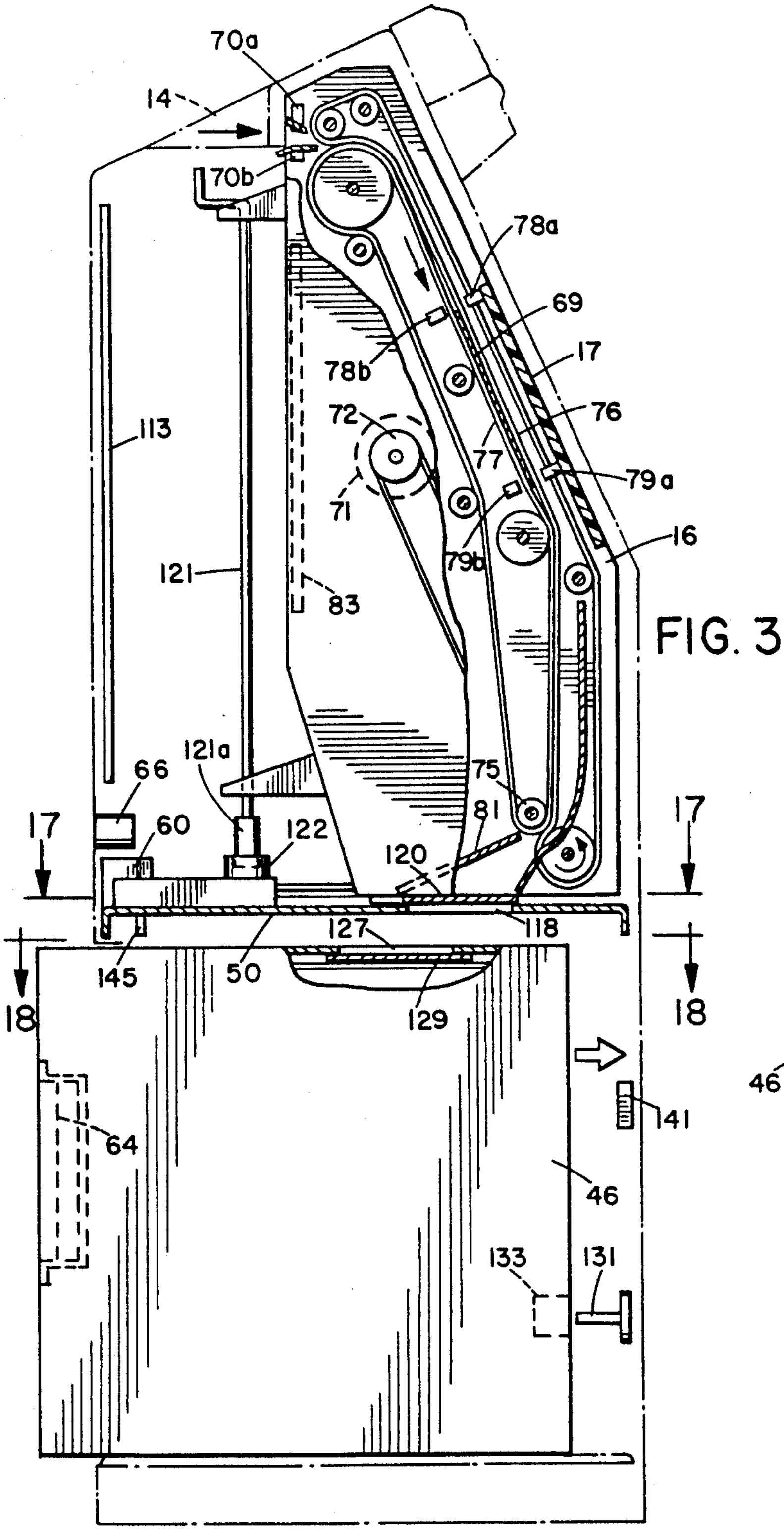
FIG. 3 is a cutaway view of one side of the farebox showing a bill module for feeding a bill from a bill entry aperture to a cashbox while detecting the length of the bill.
Figure 3A:
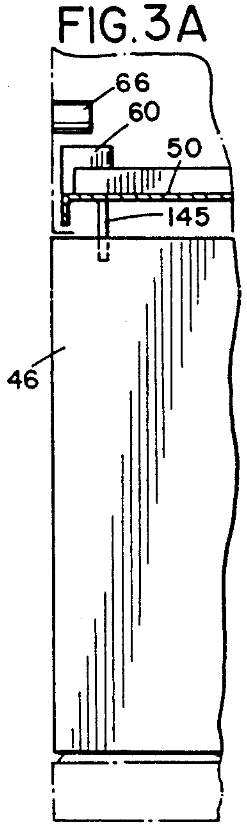
FIG. 3A is an enlarged view of the front of the cashbox of FIG. 3 showing the cashbox seated and locked in the farebox.
Figure 4A:
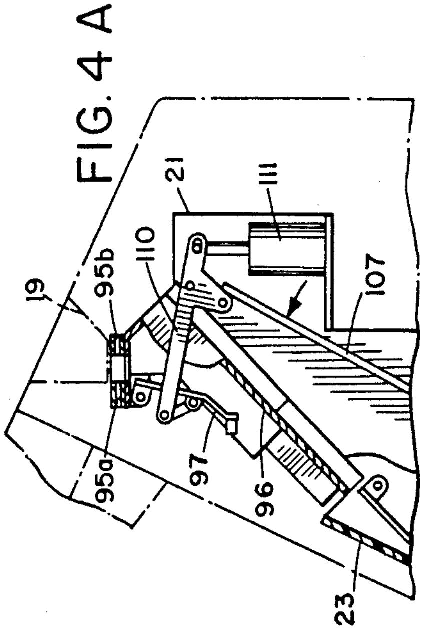
FIG. 4A is an enlarged sectional view of a portion of a coin feed mechanism in the coin module of FIG. 4.

Refer now to FIGS. 2 and 3 for an understanding of the structure of the bill feeder and detector module 16. During operation, the bill aperture 14 is illuminated by means not shown and will accept any United States currency note in circulation. In addition, passengers may purchase tickets such as preprinted cardboard tickets which are produced in respective lengths, with the length of a prepaid ticket corresponding to fare value prepaid by the passenger holding the ticket. The lengths of prepaid tickets differ from the length of a U.S. currency bill. The fare processing described below assumes that recognized currency bills are one dollar in value, without regard to the actual value of the bill. Thus, a one hundred dollar bill will be recognized and accorded a value of one dollar.

A bill is entered through the bill acceptor aperture 14 in the direction of the arrow shown. When the bill enters the housing of the bill module 16 through the aperture 14, its leading edge is detected by an optical sensor pair 70*a* and 70*b*. When the edge of the bill passes between the sensor pair, the sensor pair provide a BILL PRESENT signal to a fare processor, described below, which, in response, transmits a START MOTOR signal to the bill module 16. The START MOTOR signal causes a conventional motor 71 to rotate. A drive pulley 72 connected to the output shaft of the motor 71 provides power through a drive belt to a pair of geared pulleys 73*a* and 73*b*. The geared pulley 73*a* is rotated by the belt that engages the motor pulley 72 and, in rotating, causes the geared pulley 73*b* to rotate.

The geared pulleys 73*a* and 73*b* are conventionally connected to drive pulleys 74 and 75, respectively, that are conventionally rotatably mounted on shafts in the interior of the bill module 16. Rotation of the drive pulleys 74 and 75 causes a pair of endless transport belts 76 and 77 to begin rotating so as to nip the leading edge of a bill entered through the aperture 14 and to transport the bill in the interior of the bill module 16 towards the escrow window 17. The escrow window 17 is formed from a clear transparent material and is an integral part of the bill module 16. When the trailing edge of the bill is transported by the endless belts 76 and 77 to a location between an optical sensor pair 78*a* and 78*b*, the sensor pair 78*a* and 78*b* cause a MEASURE BILL signal to be sent to the fare processor described below which, in turn, issues a signal to stop the motor 71 rotating for a predetermined period of time. Immediately after the motor 71 ceases rotation, another optical sensor pair 79*a* and 79*b* are sampled to determine whether the leading edge of the bill blocks the sensor pair or not. If the bill trailing edge does not block the sensor pair, it is determined to be of a predetermined length corresponding to a prepaid ticket having a certain equivalent cash value. If the sensor pair 79*a* and 79*b* is blocked, the bill is determined to be a U.S. currency bill of one dollar denomination. Since the bill is halted immediately under the escrow window 17, the denomination of the bill can be confirmed visually by the farebox operator.

After the elapse of a predetermined amount of time after the trailing edge of the bill passes the optical sensor pair 78*a* and 78*b*, or if the operator touches a DUMP key on the keyboard 36, the motor 71 is once again activated, causing the belts 76 and 77 to begin rotating again in a direction that carries the bill downwardly in the bill module toward the drive rollers 74 and 75. As the bill is transported between the rollers 74 and 75 it is guided by the plate 81 out the bottom of the bill module 16. After a predetermined period of time, if another BILL PRESENT signal has not been received, the fare processor will remove the signal enabling the motor 71 to rotate. If another ticket or bill has been detected by the sensing pair 70*a* and 70*b*, the morot 71 will continue rotating and the sequence described above will repeat.

A printed circuitboard assembly 83 provides conventional interface circuitry for receiving, formatting, and forwarding signals from the optical sensor pairs 70*a* and 70*b*, 78*a* and 78*b*, and 79*a* and 79*b*. The printed circuitboard assembly 83 also carries conventional circuitry for forwarding sensor signals from the coin module to the below-described fare processor.

Reference to FIGS. 2, 4, and 4A, and 16 will provide an understanding of the structure and operation of the coin singulator and discriminator module 21. The coin aperture 19 is also illuminated (by means not illustrated) to aid the passenger in locating it. The passenger inserts coins or tokens of predetermined denominations into the coin aperture where they fall into the coin singulator and discriminator module 21. Coins fall from the aperture 19 past a set of optical sensor pairs, one pair shown as 95*a* and 95*b*, onto a sloped ramp surface 96 whereupon they travel for a short distance until their direction is changed by a ramped guide flange that forms a conventional hopper 97. The hopper translates the motion of coins moving on the surface 96 toward a conventional coin singulator mechanism 99.

The sensors 95*a* and 95*b* indicate the presence of coins in the module by COIN PRESENT, signals sent to fare processor. In response, the fare processor sends a RUN SINGULATOR signal to turn on the coin singulator mechanism in 99. Then, by the time coins reach the mechanism 99, the mechanism is operating, ready to separate the coins.

The hopper 97 includes an electrostatic sensor, not shown, that detects and indicates to the fare processor the presence of a coin in the singulator mechanism 99. So long as the electrostatic sensor detects presence of a coin in the mechanism 99 the below-described fare processor responds by maintaining the signal to the singulator mechanism 99 that enables the singulator to continue operation.

The hopper 97 and the singulator mechanism 99 operate conventionally to feed coins one-by-one in a sequence through a coin discriminator 100. Coin discriminators are known, one example being given in the U.S. Patent Application entitled COIN DISCRIMINATOR, Serial No. 739,869, filed May 31, 1985, and assigned to the assignee of this patent application. The coin discriminator 100 detects the denomination of each coin in the sequence provided by the singulator mechanism 99 and provides signals to the fare processor indicating first the presence of a coin (COIN PRESENT) and second the denomination of the coin (penny, dime, . . . token, or tokens).

Coins pass through the discriminator 100 and fall on a plate 101 hinged at hinge 102. In the hinged plate's normal position, its end contacts a coin retaining wall 103 to stop the movement of coins through the coin module 21 under the escrow window 23. As coins collect under the escrow window 23, their denominations can be confirmed visually by the driver.

The end of the hinged plate 101 is pulled away from the coin retaining wall 103 by a pivoted plate retraction linkage 104. The plate retraction linkage is pivoted either by a solenoid 105 or by a manual coin dump lever arm 106 connected to and operated by the manual coin dump lever 39. Thus coins can be dropped from under the escrow window either by the driver's operation of the dump lever 39 or automatically by the action of the solenoid 105. The solenoid is activated in response to a signal received from the below-described fare processor. In normal operation, the solenoid 105 is operated to dump coins after the elapse of a 10-second timeout period that is initiated when the electrostatic sensor in the singulator mechanism 99 detects no coins. Another sensor, not shown, on the plate 101 detects when enough coins have collected in the plate 101 before lapse of the time period to cover a predetermined position of the plate 101. This sensor then provides a HOPPER FULL signal to the fare processor and the fare processor operates the solenoid 105 to drive the coins.

When coins are dumped either manually or automatically, they fall through a chute 114 out an opening in the bottom of the coin module 21.

The automatic operation of the coin module singulator mechanism 99 and coin discriminator 100 can be overridden either automatically or manually. Manual override is provided by depression of the override lever 49 by a driver. Depression of the override button 49 causes an override shaft 107 to pivot on pivot point 108 in the direction of the arrow in FIG. 4A. The shaft 107 moves a linkage assembly 110, which movement lifts the hopper 97 off of the sloped surface 96. When the ramped guide plate is lifted from the surface 96, coins fall directly through the aperture 19 along the sloped surface 96 onto the hinged plate 101. Once the override lever is depressed, the coin module 21 will not operate automatically until the farebox is reset by a supervisor.

The linkage mechanism 110 can also be operated by a solenoid 111 that is activated by the below-described fare processor when the fare processor detects that the singulator mechanism 99 has jammed.

A printed circuitboard assembly 112 is mounted on the lower back portion of the coin module 21. The printed circuitboard assembly 112 contains conventional circuitry for receiving optical sensor signals from the singulator mechanism 99 and coin present and coin denomination signals from the coin discriminator 110. The conventional circuitry on the circuitboard assembly further formats those signals and forwards them over conventional cable means, not shown, to the below-described fare processor that is located on another fare processor printed circuitboard assembly 113 mounted on the interior backwall of the upper portion of the farebox 10.

Refer now to FIGS. 2–5, 17 and 18 for an understanding of the secure receipt and storage of coins and bills by the farebox of the invention. As illustrated in FIGS. 2, 3, 3A, and 4, the interior of the farebox housing 12 is divided approximately in half by a security plate 50 that is fixedly attached to the interior of the housing. The security plate 50 has a bill aperture 118 (FIGS. 3 and 17) that communicates with the bottom of the bill module 16 and provides an opening for bills and tickets to fall from the bill module 16 downwardly through the plate 50. A coin aperture 119 (FIGS. 4 and 17) is provided in the security plate underneath the coin module 21 and in alignment with the bottom of the coin shaft 114. Attached to the housing 12 adjacent security plate 50 and centered over the coin aperture 119 is a coin chute 116 that provides a continuous path of travel for coins dumped from the coin module 21, the path of travel extending from the coin module coin chute 114 through the security plate coin chute 116 and downwardly through the security plate coin aperture 119. The security plate coin chute 116 has a conventional "anti-fish" funnel construction with a pair of oppositely-directed ramped surfaces 117*a* and 117*b* to prevent a person reaching through the coin aperture 119 should the coin module 21 be removed from the farebox 10.

Figure 17:
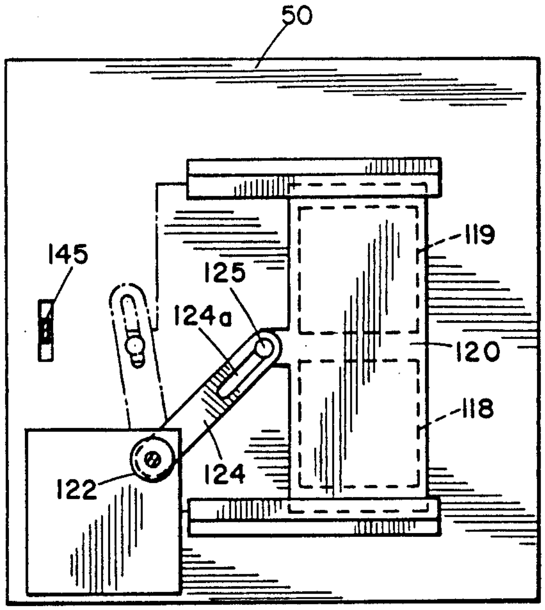
FIG. 17 is a sectional view taken along 17—17 of FIG. 3.

When the bill module 16 is removed from the farebox, the bill and coin apertures 118 and 119 in the security plate 50 are closed by a shutter 120. The shutter is slidably attached to the upperside of the security plate 50 and slides between a first position away from the apertures 118 and 119 (shown in FIG. 4) and a second position closing both of the apertures (FIGS. 3 and 17).

The shutter 120 is slidably moved between the two positions by a linkage apparatus including a shutter rotating rod 121 that is rotatably attached to the bill module 16, a keyed pin-and-socket linkage 122 and a slide linkage arm 124. When the rod 121 is rotated to one position, it rotates the linkage 124. As best seen in FIG. 17, a slot 124*a* in the linkage 124 draws the shutter 120 by means of a trunnion 125 attached to the shutter that extends through the slot. Rotation of the rod 121 in the other direction causes the shutter to move to the other position.

The rotating rod 121 can be detached from the shutter linkage mechanism when the keyed end 121A of the rod 121 is rotated to a position that closes the shutter 120. Therefore, extraction of the bill module requires, rotation of the rod, which closes the shutter 120 and prevents unauthorized entry into the cashbox 46.

Reference to FIGS. 2–5 and 18 will provide an understanding of insertion, operation, and removal of the cashbox 46. The cashbox is shown partially inserted into the farebox in FIG. 3, fully inserted in FIGS. 2, 3A, and 4, and removed from the farebox in FIG. 5.

Figure 5:
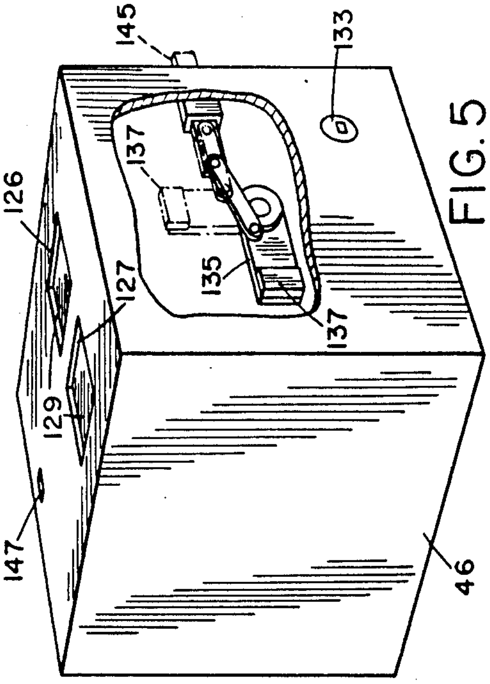
FIG. 5 is a perspective view of the cashbox removed from the farebox.
Figure 4:
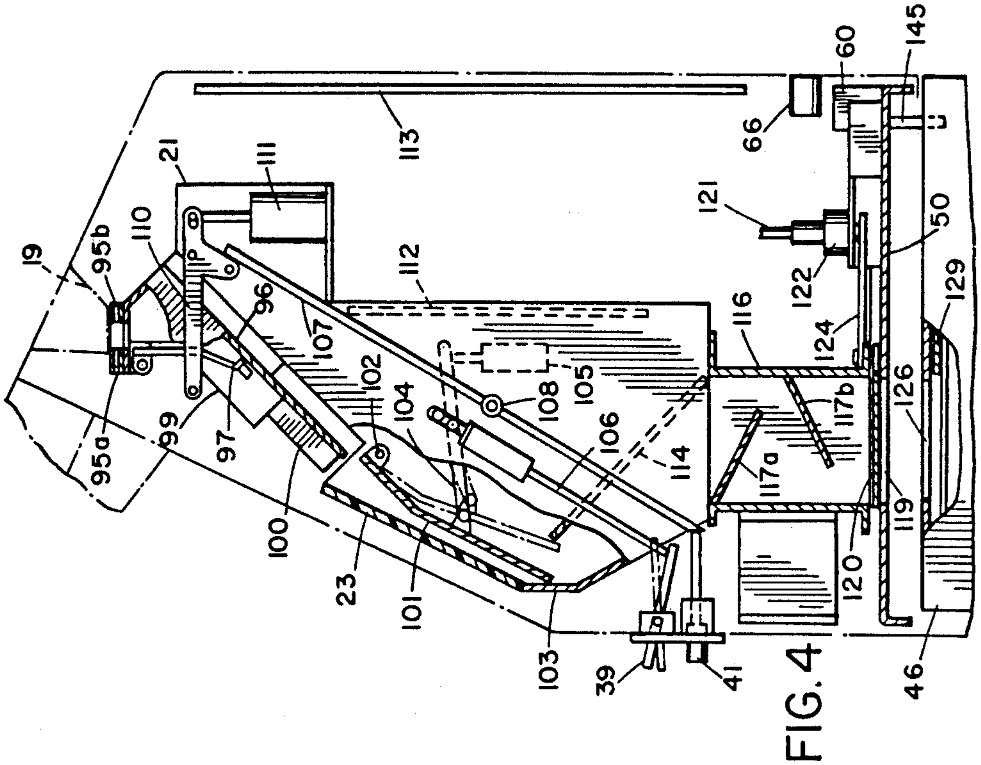
FIG. 4 is a cutaway view of another side of the farebox showing a coin module for sequencing and feeding coins from a coin entry aperture to the cashbox while detecting the denomination of each coin in the sequence.
Figure 18:
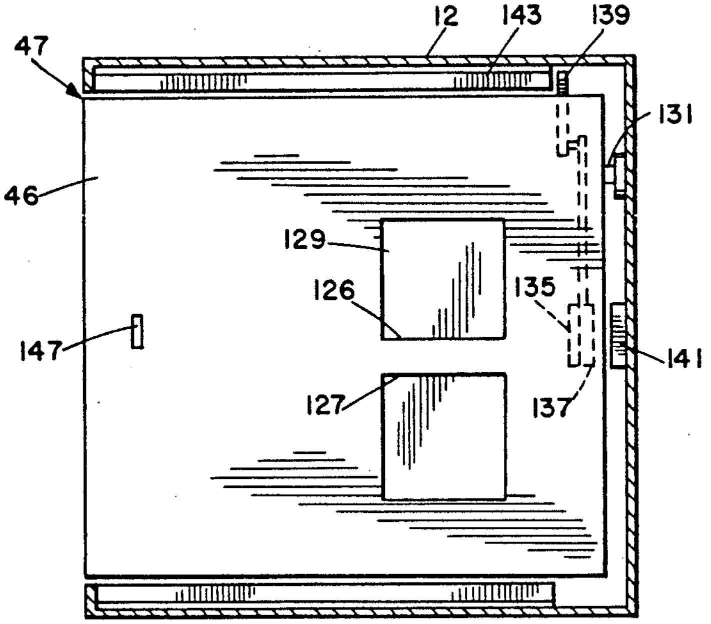
FIG. 18 is a sectional view of the fare box taken along 18—18 of FIG. 3.
Figure 19:
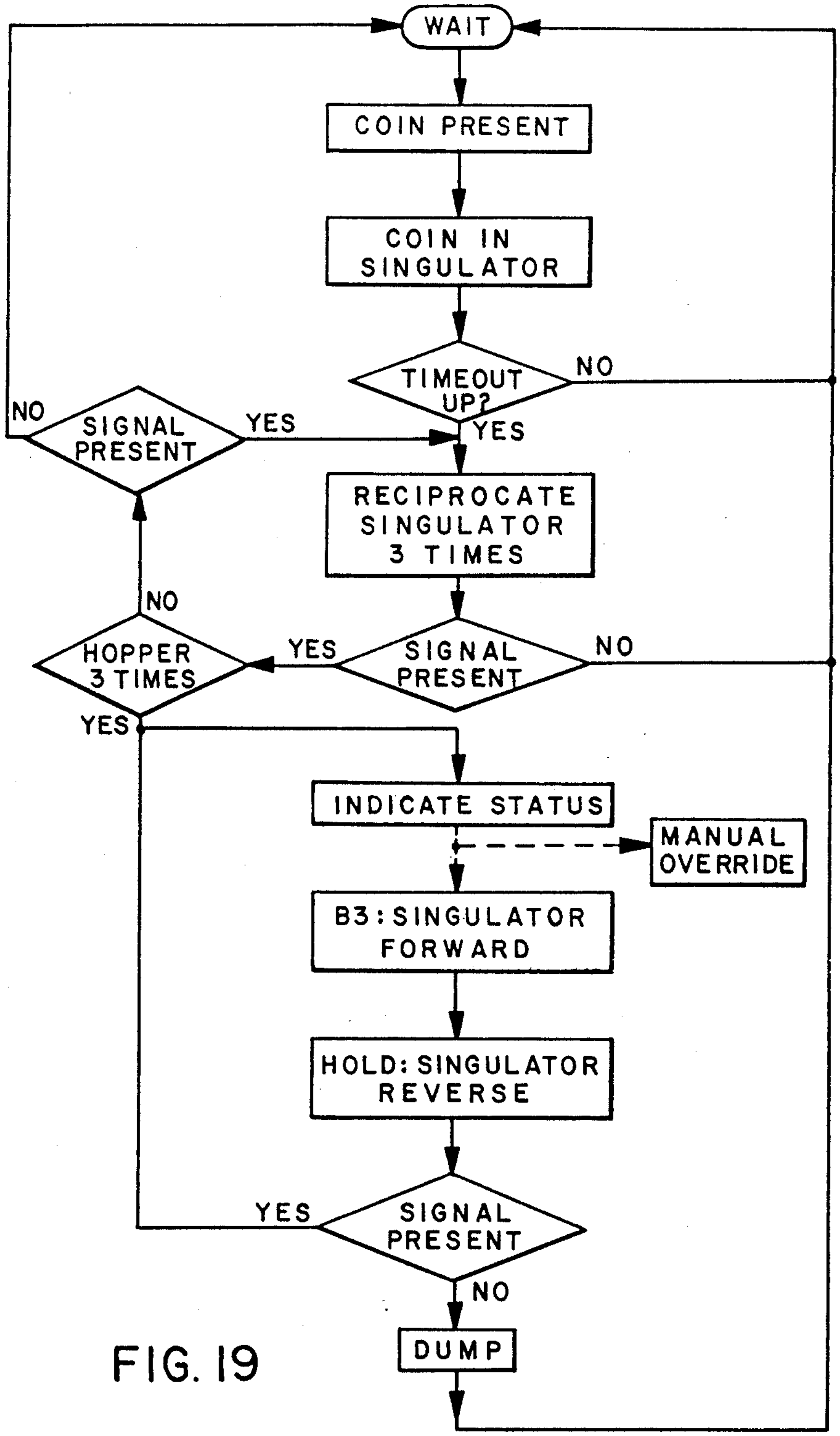
FIG. 19 is a flow diagram illustrating an unjam procedure for the coin module.

As best seen in FIGS. 5 and 18, the cashbox 46 includes a pair of apertures 126 and 127 through which bills and coins, respectively, pass to be collected in separate compartments (not shown) in the interior of the cashbox 46. One compartment is for the collection of bills and tickets; the other for the collection of coins and tokens. The structure of the cashbox 46 includes a top cover formed from a pair of parallel plates that sandwich an interlock mechanism (not shown) that couples the rotatable lock handle 64 to a sliding shutter 129. The interlock mechanism is not illustrated in detail but comprises a suitable mechanical linkage to convert rotation of handle 64 to sliding of shutter 129 to open or close cashbox apertures 126, 127. For example, the handle may be linked to a rotatable shaft on which an interlock mechanism linked to the shutter 129 is mounted. The internal interlock mechanism is actuated by the rotatable handle 64. When the handle is rotated to a locked position, the internal mechanism slides the shutter 129 to a position that closes the bill and coin apertures 126 and 127. Rotation of the handle to an unlocked position causes the interlocking mechanism to slide the shutter 129 to a position away from the apertures 126 and 127 so that bills and coins can fall into their respective compartments internal to the cashbox 46. The shutter 129 is shown in the locked position in FIGS. 3 and 5 where the cashbox is either partially inserted into the farebox or removed from the farebox. It should be evident that the positioning of the shutter to close the bill and coin apertures of the cashbox 46 before the cashbox is fully inserted in the farebox 10 is necessary to prevent unauthorized entry into the collection chambers of the cashbox.

When the cashbox is not seated in the farebox, as seen in FIG. 3, the handle 64 is normally locked against rotation and is released when the cashbox 46 is placed in the farebox chamber 47 by a magnetic key pin 131 (FIGS. 3 and 18) projecting from the lower housing into the interior of the chamber 47. When the cashbox 46 is slid into the chamber as in FIG. 18, the magnetic key pin 131 enters a key slot 133. The key slot 133 admits the magnetic key pin 131 into the interior of the cashbox 46 where the key pin unlocks the interlocking mechanism, permitting the handle 64 to be rotated in a direction that causes the interlocking mechanism to slide the shutter 129 to the unlocked position opening the apertures 126 and 127.

As seen in FIGS. 5 and 18, the interlocking mechanism of the cashbox 46 is also connected to rotate a magnetic key carrier 135 that carries a magnetic key 137 and a locking tang 139. Rotation of the magnetic key 137 on the key carrier 135 when the handle 64 is rotated to the open position places the magnetic key 137 adjacent a key position sensor 141 mounted on the backwall of the lower portion of the housing 12. When the magnetic key 137 is rotated opposite the sensor 141, the sensor 141 transmits a CASHBOX SEATED signal to the below-described fare processor. The rotation of the locking tang 139 from out of the sidewall of the cashbox 46 places the tang behind the projection 143 in the lower chamber 47 of the farebox. This retains the cashbox 46 in the lower chamber 47 so long as the handle 64 is rotated to the unlocked position. It should be evident that if the handle 64 is rotated to the locked position for removal of the cashbox, entry to the cashbox will be denied by the shutter 129 being slid to close the apertures 126 and 127.

When the cashbox 46 has been seated in the lower farebox chamber 47 and the handle 64 rotated to the unlocked position, the CASHBOX SEATED signal prompts the below-described fare processor to transmit a LOCK signal to the electrically-actuated lock 60 which causes the lock 60 to insert a locking tang 145 into a slot 147 on the top surface of the cashbox. The locking tang 145 prevents removal of the cashbox from the lower chamber of the farebox even in the event that the handle 64 is rotated to the closed position.

Figure 6:
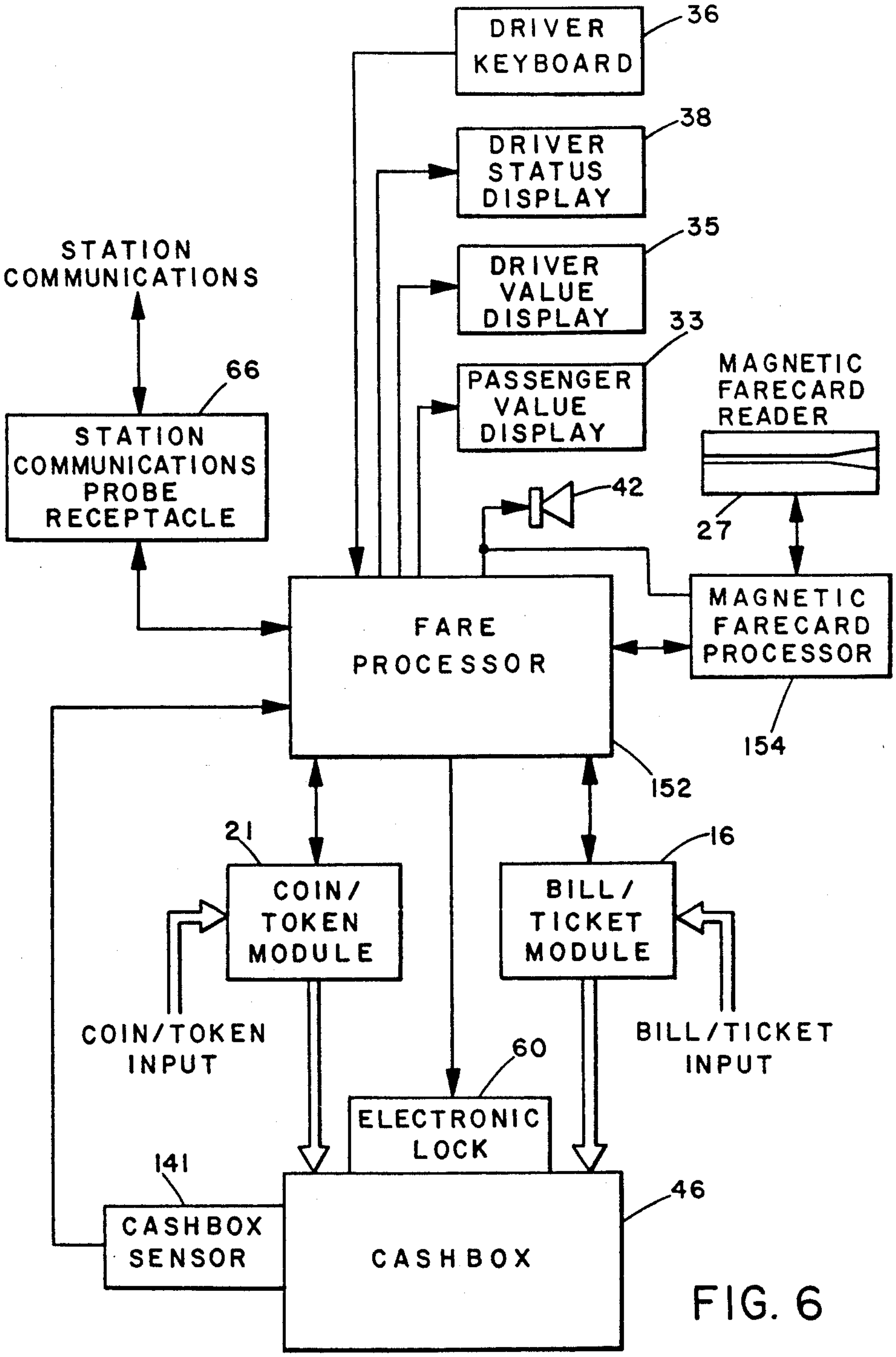
FIG. 6 is a functional block diagram of the critical components of the farebox of the invention.

Reference now to FIG. 6 will aid in an overall understanding of the full complement of functions performed by the critical units of the farebox 10. Central to the farebox operation is a fare processor 152 having connection to the passenger value display 33, the driver value display 35, the driver status display 38, the driver alphanumeric keyboard 36, and the speaker 42. Audible and visual messages indicating the outcome of a fare transaction are provided to a passenger through the passenger value display 33 and the speaker 42. The passenger value display 33 in the preferred embodiment comprises a conventional multi-segment alphanumeric display that operates in response to digital signals provided from the fare processor 152. The speaker 42 produces audible tones and messages in response to analog signals that are converted from conventional digital signals produced by the processor 152. The driver value display 35 corresponds essentially to the passenger value display 33.

The driver status display 38 comprises a conventional multi-element ASCII display that operates in response to ASCII code signals from the fare processor 152. The driver alphanumeric keyboard 36 is a typical manually-operated keyboard whose entry panel is illustrated in greater detail in FIG. 9. The keyboard 36 conventionally produces respective digitally-encoded signals in response to the depression of keys on the keyboard. The keys are depressed by the driver in predetermined sequences to provide . associated predetermined codes that are provided to the fare processor 152 to place the processor in respective associated operational states.

Signals corresponding to magnetically-encoded signals on a fare card are obtained through the magnetic farecard reader 27 by a magnetic farecard processor 154. The processor 154 conducts a magnetic fare process in response to magnetically-encoded cards swiped through the reader 27 (described below) and passes the results to the fare processor 152.

The bill module 16 and coin module 21 are electrically connected to exchange the sensor, control, and data signals described above with the fare processor 152.

Insertion and locking of the cashbox 46 in the farebox 10 by means of the mechanical lock described above are indicated by the cashbox sensor 141 to the fare processor 152. Upon determining on the basis of the CASHBOX SEATED signal provided by the sensor 156 that the cashbox 46 has been properly seated and locked in the farebox 10, the fare processor 152 transmits a signal to the electronic lock 60 that causes the lock flange to rotate and lock the cashbox 46 in place in the farebox 10.

The station communications probe receptacle 66 provides for 2-way communication between a station communications system (not shown) and the fare processor unit 152. To effect removal of the cashbox 46 after rotation of the cashbox lock 64 to the closed position, the station communications system by way of the probe receptacle 66 sends a particular command (described below) to the fare processor 152 containing a secure unlocking code. In response to the unlocking code, the fare processor 152 transmits a signal to the electronic lock 60 causing it to rotate the lock tang 145 out of the cashbox receptacle, thereby permitting the cashbox 46 to be extracted from the farebox 10.

Figure 7:
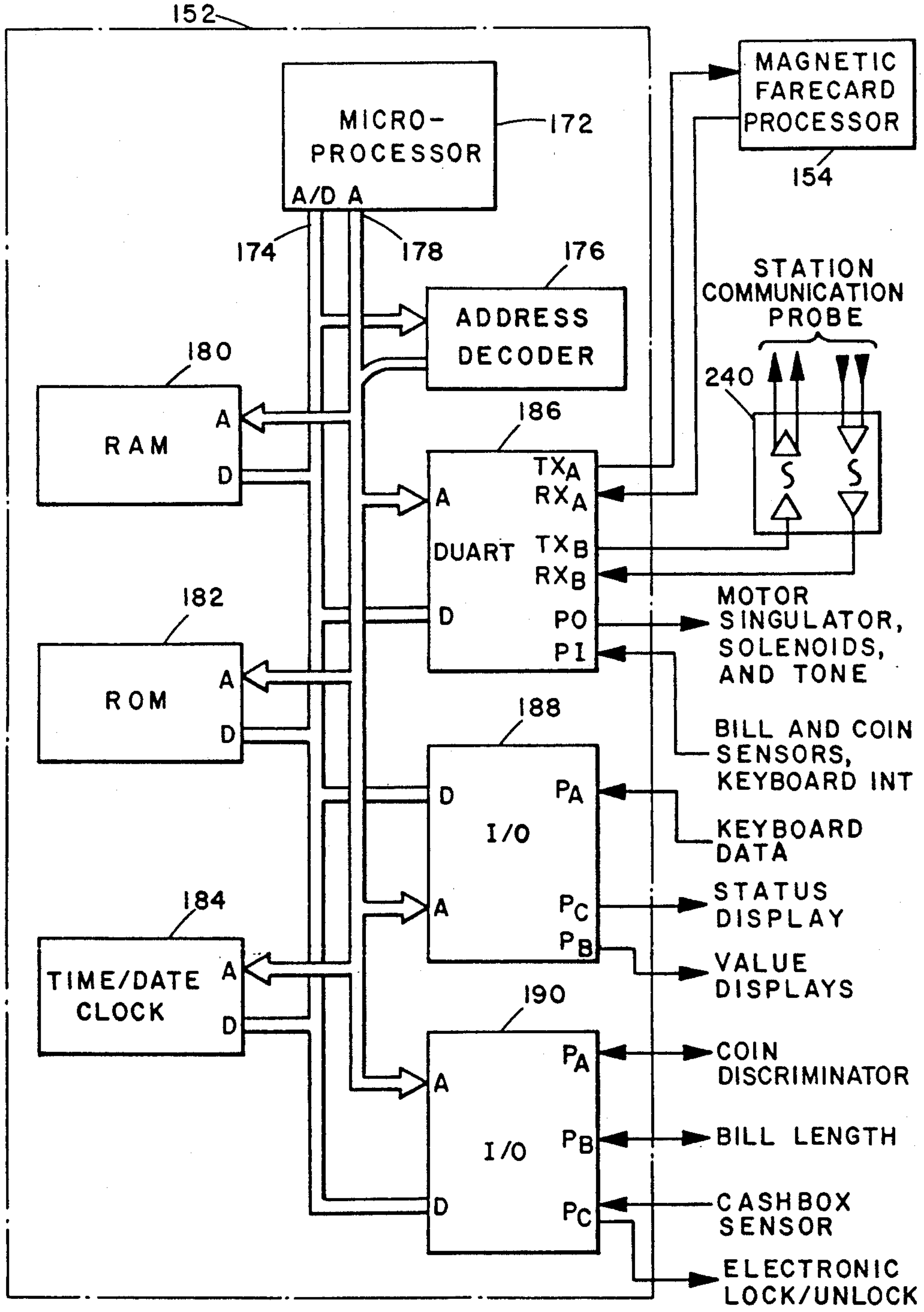
FIG. 7 is a functional block diagram of a fare processor that automatically conducts a fare transaction based upon receipt of fare payment media by the farebox of the invention.

The structure of the farebox processor 152 is illustrated in greater detail in FIG. 7, wherein a conventional microprocessor 172 has data and address signal conductivity provided by means of a conventional address/data (A/D) bus 174 and a conventional address (A) bus 178. In this embodiment, the microprocessor 172 is equivalent to the INTEL 8085 device. An address decoder 176 is conventionally connected to the A/D bus 174 to receive data signals therefrom that are provided on the A/D bus 174 during a data cycle. In typical fashion, the address decoder 176 converts data provided on the A/D bus 174 into address signals that augment a complement of address signals provided by an address cycle on the A bus 178 by the microprocessor 172. A conventional battery-backed random-access memory (RAM) 180 is conventionally operated by the microprocessor 172 to permit immediate storage and retrieval of data signals in storage locations indicated by addresses on the address bus 178. Similarly, a read-only memory (ROM) 182 permanently stores program data that is obtained by the microprocessor 172 over the A/D bus 174 in response to address signals on the A bus 178. A time/date clock circuit operates conventionally to provide updated time/date information on the A/D bus 174 in response to address signals.

Interface between the microprocessor 172 on the one hand and the magnetic farecard processor 154 and the station communications probe receptacle 66 is provided through a dual universal asynchronous receive-transmit (DUART) module 186. A first pair of oppositely-directed half-duplex ports $T_{XA}$ and $R_{XA}$ provide asynchronous duplex operation between the microprocessor 172 and the farecard processor 154. Another pair of oppositely-directed half-duplex ports provide another asynchronous, full-duplex transmission path between the microprocessor 172 and the station communications probe receptacle 66. A first group of conventional output ports $P_O$ permit the microprocessor 172 to provide the START MOTOR control signal to the bill module motor 71, the RUN SINGULATOR control signal to the singulation mechanism 100, and the control signals to the solenoids 105 and 111. Also provided is a tone signal for driving a speaker 42. A set of parallel input ports $P_I$ in the UART 186 permit BILL PRESENT and MEASURE BILL signals from the bill module, the coin present and singulator sensor signals, and interrupt signals from the keyboard to be connected to the processor 172.

The DUART 186 provides the signals input from the bill module 16, the coin module 21, and the keyboard 36 to be classed as interrupt signals that conventionally interrupt ongoing program activities being carried out by the microprocessor 172. The DUART 186 provides signals from the bill module sensor pair 78*a* and 78*b* to inform the processor 172 when the bill has reached the measuring position behind the escrow window. The DUART also receives at port $P_I$ the signal from the sensor and the singulator mechanism 99 indicating the presence of a coin.

The DUART 186 outputs signals from the microprocessor 172 to control rotation of the bill module motor 71, to start and stop operation of the singulator apparatus 99, and to operate the coin module solenoids 105 and 11.

A conventional I/O expander 188 is connected to the A/D bus 174 and the A bus 178 to be conventionally controlled by the microprocessor 172 to provide data from the keyboard 36 to the microprocessor 172. A conventional set of output ports $P_C$ provide connectivity between the microprocessor 172 and the status display 38.

Another I/O expander 190 provides connectivity between the coin discriminator 100 by way of circuit board 112 and the microprocessor 152. The coin discriminator provides signals indicating that it is operating and determining the denomination of a coin and also signals indicating the coin denomination. The I/O expander 190 further receives sensor signals from the bill module 16 indicating the length (and therefore, the denomination or prepaid value) of a bill or ticket. Finally, the cashbox position sensor 141 provides the CASHBOX SEATED signal through the I/O expander 190, while the microprocessor 172 outputs a 2-state electronic lock signal, the first state, LOCK, operating the electronic lock 60 to insert the lock tang 145 into the cashbox slot 147; another state, UNLOCK, causing the electronic lock 60 to withdraw the tang 145 and thereby free the cashbox for removal from the farebox 10.

As explained below, the RAM 180 is used to maintain a plurality of transit fare audit registers as well as registers for conducting fare transaction calculations. The ROM 182 in the preferred embodiment includes an electronically-alterable as well as permanently unalterable ROM. The unalterable ROM contains all of the programming necessary to operate the microprocessor 172. The electrically-alterable ROM also contains fare tables (described in further detail below).

Figure 8:
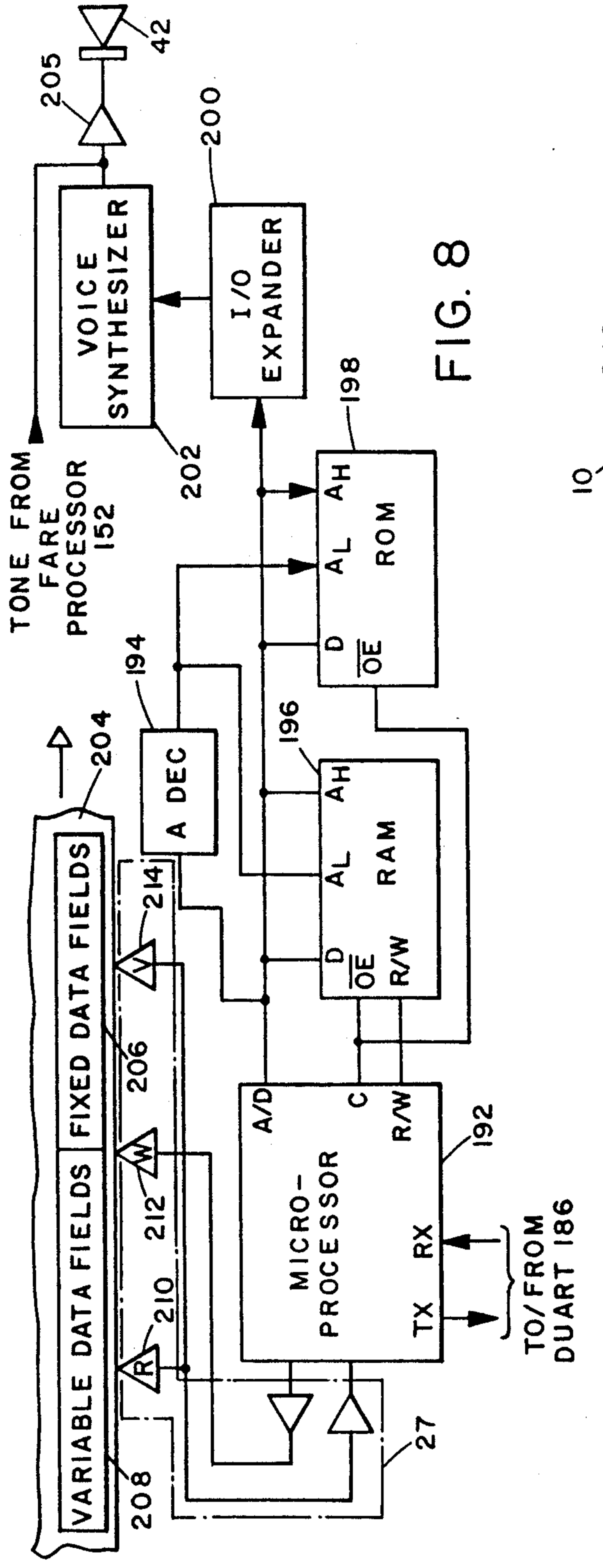
FIG. 8 is a block diagram of a magnetic farecard processor block of the FIG. 7 fare processor.

The magnetic farecard processor 154 is shown in greater detail in FIG. 8. The farecard processor can comprise, for example, a card reader and processor structure that reads, writes, and verifies magnetic data carried in a strip of magnetically-orientable material on a magnetic farecard. A reader, processor, and farecard satisfying the requirements of the processor 154 and the reader 27 is described in detail in the co-pending U.S. patent application Ser. No. 562,449, filed Dec. 15, 1983 and assigned to the assignee of this application.

Briefly, the magnetic fare processor includes a microprocessor 192 (INTEL 8031, for example) connected conventionally to an address decoder 194, a RAM 196, and a ROM 198. Through a conventional I/O expander 200, the microprocessor 192 drives a conventional digital-to-analog voice synthesizer 202 that is connected to operate the speaker 42. Both the synthesizer 202 and the fare processor 152 input to the speaker 42 through a bandpass amplifier 205. The microprocessor 192 includes a pair of oppositely-directed half-duplex ports $T_X$ and $R_X$ that are connected to the ports $R_{XA}$ and $T_{XA}$, respectively, of the UART 186 in the fare processor 152.

The magnetic farecard processor 154 operates in response to a magnetic farecard, a portion of which is indicated by 204. The magnetic farecard has a strip of magnetizable material defining a fixed data field 206 containing unalterable data signals indicative of whether the card is carried by a passenger or a supervisor and, if by a passenger, what category of fare the passenger is entitled to. The magnetizable strip of material also defines a variable data field 208 containing alterable data signals that indicate, among other things, a total value which can be applied against the fare to be charged for the fare category indicated in the fixed data field 206. The card is entered into the data card reader 27 which contains a conventional magnetic read (R) head 210, a conventional magnetic write (W) head 212, and a magnetic verify (V) head 214. As the card is swept in the direction of the arrow, data signals are read through the read head 210 by the microprocessor 192, which responds to the read data by conducting a fare transaction and entering the results of the transaction into the variable data field 208 through the write head 212. The written data is verified by means of the verify head 214.

The RAM 196 is used by the microprocessor 192 for variable data storage, for storage of a currently-selected fare table, and for storage of fare calculation results produced by the microprocessor 192. The ROM 198 contains the program for operating the microprocessor 192 as well as a complement of digital signals corresponding to conventional predetermined audio messages that are provided in digital format to the voice synthesizer 202 for conversion into audible messages that are forwarded to the speaker 42.

When a magnetic farecard such as the farecard 204 is swiped through the reader 27 and the variable data field data is read by the microprocessor 192, the processor 192 conducts a fare transaction based on the information read. In the preferred embodiment of the invention, the fixed data field will contain information indicating whether the card is a prepaid pass (for example, a monthly pass good for an unlimited number of rides), or whether the farecard is good for payment of a fare in a certain category. If the farecard is a prepaid unlimited pass, the microprocessor 192 records the type of pass and causes a predetermined voice message signal to be extracted from the ROM 198 and passed through the voice synthesizer 202 to the speaker 42. The message can comprise, for example, "thank you." If the card is issued for a prepaid amount in a certain fare category, the microprocessor will determine from the variable data field the value remaining of the prepaid amount, obtain the correct fare from the fare table stored in the RAM 196, and test whether the amount remaining on the magnetic farecard equals or exceeds the fare amount obtained from the RAM 196. If the amount is sufficient to pay the fare, the fare is deducted from the amount and the remaining amount written back into the variable data field the farecard. An appropriate message will be provided by the microprocessor 192 to the speaker 42. The microprocessor will record the payment of the fare and the amount of the fare for transmission to the fare processor unit 152.

Magnetic farecards in the preferred embodiment of the invention are also issued to function as identification cards that identify passengers entitled to various fare categories (for example, senior citizens or students). When such a farecard is swiped in the reader 27, the microprocessor records the category identification for transmission to the fare processing unit 152. In these cases an appropriate message such as "student fare" is provided through the speaker 42.

Finally, the magnetic farecard processor 154 is also used to identify personnel authorized to access audit information or enter program data in the fare processing unit 152. When such a card is detected by the magnetic fare processing unit 154, the microprocessor 192 records a code contained in the fixed data field 206 that authorizes the bearer of the card access to the program in the fare processing unit 152. This identifying code is transmitted to the fare processing unit 152.

Figure 9:
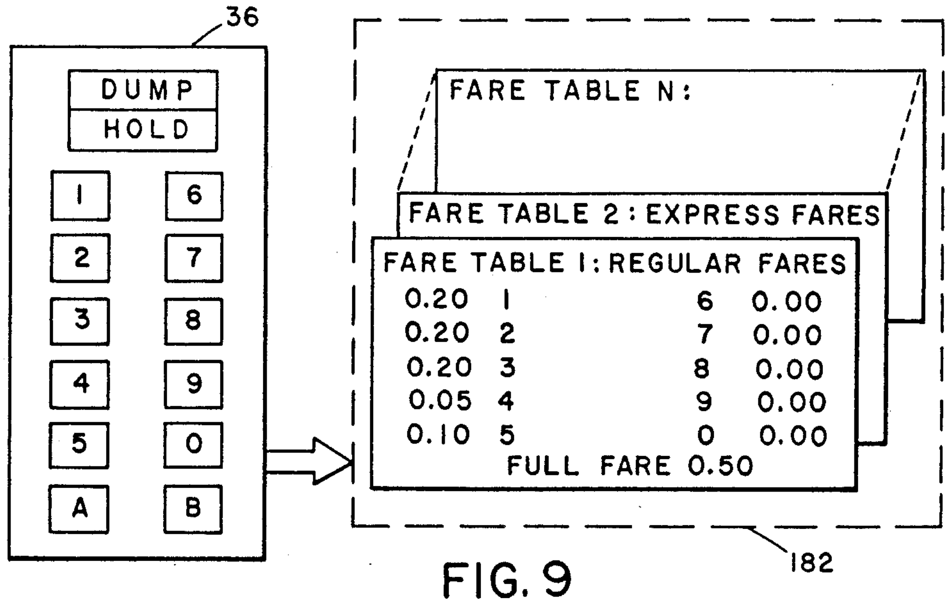
FIG. 9 illustrates the correspondence between a manual keyboard on the farebox of the invention and a series of fare tables electronically stored in the fare processor of FIG. 7.

With reference now to FIG. 9, the ability of the farebox 10 to utilize one of a plurality of fare tables in processing fare transactions can be understood. Fare tables are stored in conventional matrix form in the electronically alterable portion of the ROM 182. This is shown conceptually in FIG. 9 where Fare Table I - Fare Table N are shown enclosed in the dashed box representing the ROM 182. Each fare table contains fares set into a matrix conforming to the farebox keyboard 36. These fare tables can be updated manually through the keyboard or through a station data system, described below. Each of the numerical keys of the keyboard, accesses a position of the fare table matrix corresponding to its position. Each fare table matrix holds eleven positions (0–9 and FULL FARE). Associated with each position is a fare value, for example, twenty cents at position 1. Each position corresponds to a fare category, with the categories in the preferred embodiment laid out in Table I.

TABLE I

| | |
|---|---|
| 1. Student | 6. Student Pass |
| 2. Elderly | 7. Elderly Pass |
| 3. Disabled | 8. Disabled Pass |
| 4. Local Transfer | 9. Regular Pass |
| 5. Interagency Transfer | 10. Transfer Collected |
| Regular Fare | |

Thus, for example, key 3 on the keyboard corresponds to position 3 in Fare Table I which is the disabled category with a fare of $0.20 cents. Further, key position 9 corresponds to a regular fare pass that has been prepaid for an unlimited number of rides during a predetermined period of time. As explained below, as each passenger enters a bus the driver will determine what fare category the passenger is entitled to and depress a button on the keyboard corresponding to that category. If no button is depressed, it is assumed that the passenger is a full fare passenger and will tender the fare in either bills, tickets, or coins, or some combination thereof.

The fare table which is currently selected, as explained below, is also transferred, as explained below, to the RAM 196 of the magnetic fare processor 154 in order to enable the magnetic farecard processor to conduct transactions without having to access the ROM 182 in the fare processing unit 152. Further, as explained above, in magnetic farecard transactions, the farecard category will be indicated in the encoded fixed data on the farecard, dispensing with the requirement for the driver to identify the category by depressing a button on the keyboard 36.

Figure 10:
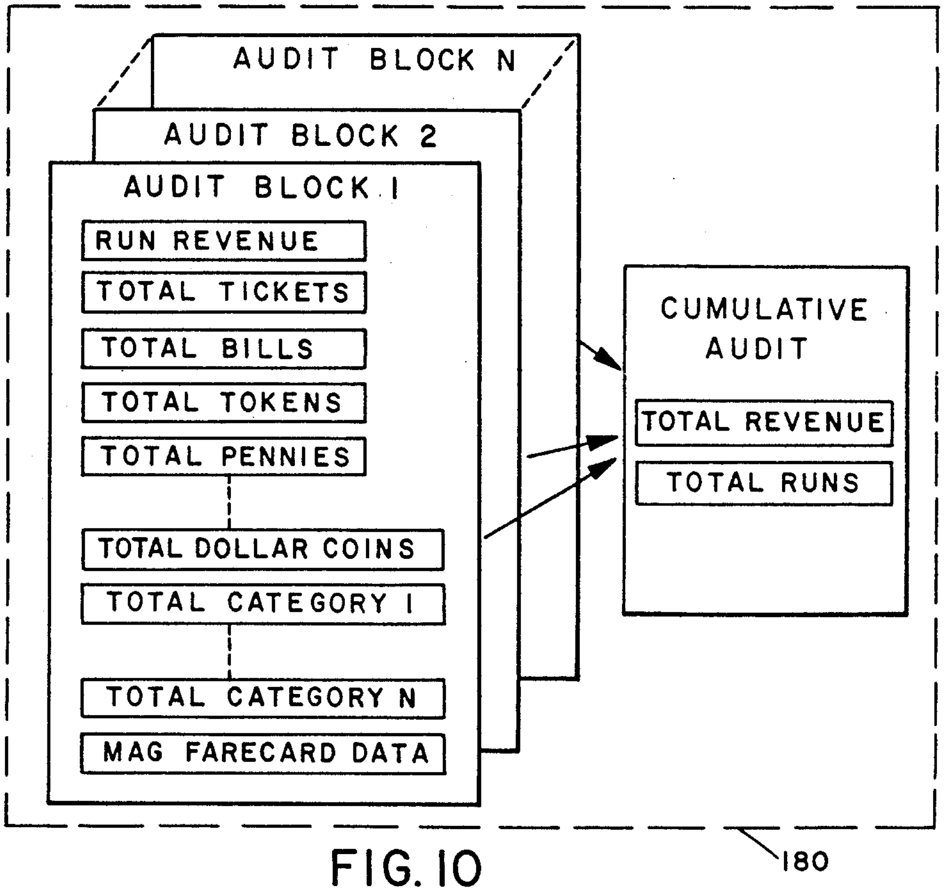
FIG. 10 is a partial schematic diagram illustrating storage of fare transaction audit data in a memory module of the fare processor of FIG. 7.

Audit information accumulated by the farebox 10 is illustrated in FIG. 10. As explained above, the fare processing unit 152 accumulates audit information in the RAM 180. The audit data are stored in conventionally-structured storage blocks which are illustrated conceptually in FIG. 10. The storage blocks are created in the RAM 180 in conventional storage block matrix format. As is typical, each block contains an addressable register for accumulating a particular class of statistical information relevant to fare transactions conducted during time blocks of operation of the farebox 10. For example, audit block 1 can correspond to the operation of a bus over a predetermined span of time on a predetermined route; thus audit block 1 can accumulate statistics regarding transit fare transactions conducted between 8:00 A.M. and 12:00 P.M. on city route M4.

The audit blocks have identical structures with registers for accumulating, for example, run revenue, total tickets accepted by the bill module 16, total bills accepted by the bill module 16, total tokens taken in by the coin module 21, the totals of the different denomination coin taken in by the coin module 16, the total category fares sold, and corresponding data resulting from fare transactions conducted by the magnetic farecard processing unit 154.

In addition, the RAM 180 includes a cumulative audit block which totals selected statistical categories from all of the individual audit blocks 1-N. In the preferred embodiment, the cumulative audit block includes a register for accumulating total revenue from the time a cashbox is inserted into a farebox until that cashbox is removed as well as the total number of runs conducted in accumulating that total revenue.

Reference to FIGS. 11–14 will provide an understanding of the procedures undertaken by the fare processing unit in conducting farebox operations. FIGS. 11–14 are flow diagrams that represent software programs for processes that are conventionally entered into the fare processor 152 and the magnetic farecard processor 154 by means well understood by reasonably skilled computer programmers.

The program and processes described for the fare processor unit are preferably conventionally embodied in a software program written in PLM-80, a high-level programming language appropriate for the INTEL 8085 (microprocessor 172). For the magnetic farecard processor, the PLM-51 high level language may be utilized conventionally to implement the FIG. 13 flowchart.

Figure 11:
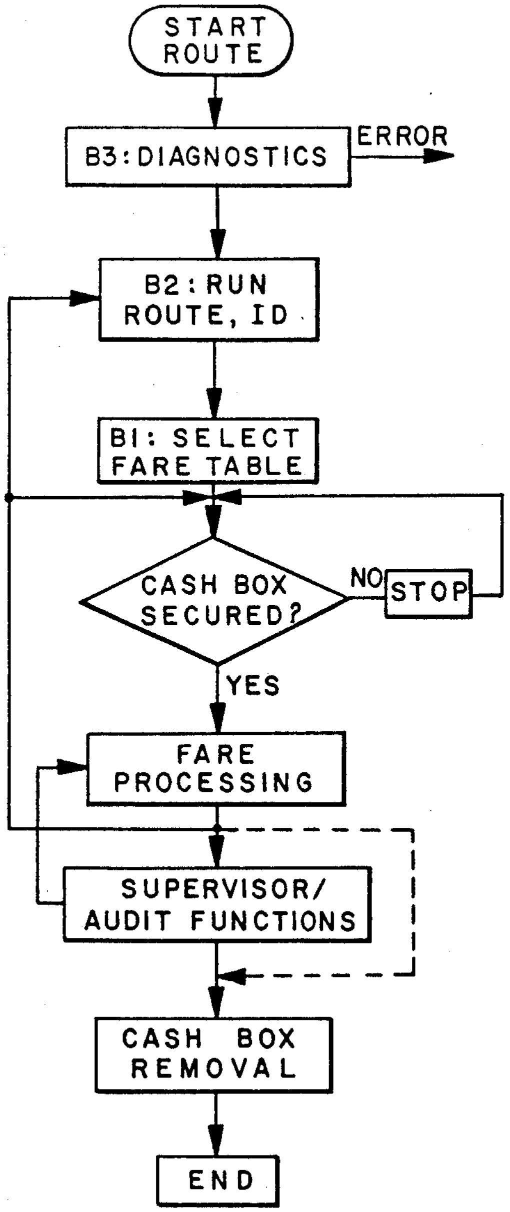
FIG. 11 is a diagram illustrating the flow of a top-level program entered into the fare processor of FIG. 7 that enables the processor to implement fare processing, auditing, and cashbox, removal functions.

FIG. 11 illustrates the overall operation of the farebox 10. Initially, a driver will take control of a bus and a farebox and will initiate the FIG. 11 program by depressing keys corresponding to B3 on the keyboard 36. The FIG. 11 program will respond to this by running a series of diagnostic tests to verify the reliable operation of the farebox. Next, the driver will enter code B2 through the keyboard 36, in response to which the fare processing unit will cause a series of prompts to be displayed in the status display 38. In response to each prompt, the driver will enter a combination of numerals that provide information enabling the fare processing unit to establish an audit block table in the RA 180. Each audit block is uniquely identified by an identification of the route to be followed by the bus, the identification of the driver, and the identification of the currently-conducted run.

Once the identifying information is entered, the driver selects keys B and 1 in response to which the fare processing unit will produce a prompt on the display 38. The prompt will cause the driver to enter a code corresponding to selection of a fare table from the ROM 182. That fare table will be accessed throughout all of the following fare transactions until another fare table is selected. The selected fare table will also be forwarded by the fare processing unit to the magnetic farecard processing unit.

Next, the fare processing unit inspects the condition of the cashbox sensor 141 to determine whether a cashbox has been securely seated in the lower portion of the farebox. If not, the fare processing unit ceases all transit fare processing operations until a valid CASHBOX SEATED signal is received. Assuming the signal has been received, the fare processing unit undertakes a fare processing task until either a new audit block is created, the cashbox is removed, or a set of supervisory/audit functions is invoked. Provision is made for continuously monitoring the CASHBOX SEATED signal throughout the fare processing operations next described. If the cashbox is unseated during those operations, the fare processing operations stop until the cashbox is reseated.

The supervisory/audit function process can be invoked during fare processing with a return to fare processing when the process is completed. Alternatively, supervisory/audit functions can be performed just before fare processing is terminated by cashbox removal. Finally, fare processing can be terminated without any invocation of the supervisory/audit functions by removal of the cashbox.

Figure 12:
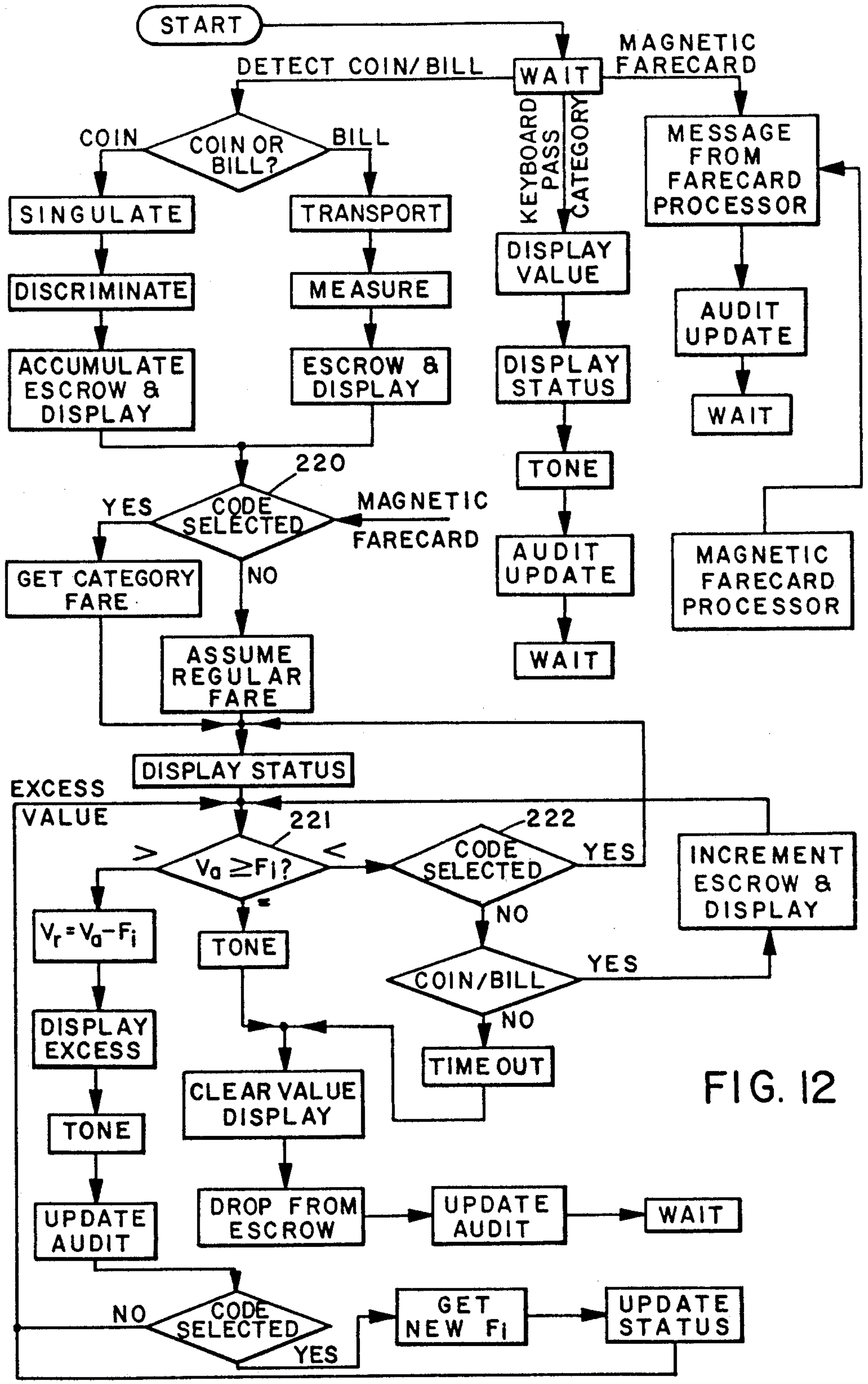
FIG. 12 is a flow diagram illustrating a fare processing process called by the program of FIG. 11.

FIG. 12 illustrates the fare processing procedure undertaken by the fare processing unit. The procedure begins initially in a WAIT state which is exited when the entry into the farebox 10 of bills, tickets, coins, or tokens is detected as described above. If coins have been entered into the farebox, the fare processor 152 exchanges the appropriate signals with the coin module 21 to begin operation of the singulator mechanism 99 and the discriminator 100. The discriminator 100 provides signals to the fare process as described above that indicate the denominations of a succession of coins that are passed to the discriminator by the singulator. As described above, the coins are accumulated under the escrow window 23.

For the first coin or token entering the farebox 10 the FIG. 12 procedure enters the decision block 220 where it determines whether or not a category code has been selected on the keyboard 36. If not, the regular fare is obtained from the selected fare table. Otherwise, the fare associated with the selected category is obtained. As explained above, the code selection may have been made automatically by way of a magnetic farecard, with the code being forwarded from the magnetic fare card processor to the fare processor 152 for use in the FIG. 12 procedure. When the code selection determination has been made, the selected or assumed code category is displayed on the status panel 38. The status panel display can comprise, for example, a code corresponding to the selected or assumed category. After display of the category code, the procedure enters decision block 221 to determine whether the coin value equals or exceeds the fare associated with the selected category, with the associated fare indicated by $F_i$. If the accumulated value $V_a$ equals the fare $F_i$, the fare processing unit causes a tone to be provided through the speaker 42, clears the driver and passenger value displays, drops the coin or coins from escrow, updates the current audit block by making the appropriate register entries, and returns to WAIT.

Returning to decision block 221, in the event that the value of coins accumulated is less than $F_i$, the procedure will exit to decision block 222 from decision block 221 to determine whether another code associated with another fare has been selected. If so, the procedure will return to decision block 221 after updating the status display. If another code has not been selected, but another coin is received, the total accumulated value is incremented, the added coin is escrowed, and the incremented value is displayed. Then the incremented value $V_a$ is tested in block 221 against the indicated fare $F_i$.

Each time another coin is taken into the coin module 21 and detected, a software-implemented timer is restarted. If, after taking the negative exit from decision block 222, no further coin is placed in the farebox, and the software timer times out, the procedure will exit to the WAIT state by clearing the value display, dropping the coins from escrow, updating all of the above described audit registers as well as an audit register for extra cash.

Finally, in the event that the accumulated value $V_a$ is larger than the indicated fare $F_i$, the lefthand exit from decision block 221 is taken and a remainder value $V_r$ is calculated and displayed, the tone indicating payment of a fare is emitted, and the audit block registers are updated to register a fare payment. In the event of an excess of payment over an indicated fare, after the audit registers are updated, the procedure tests to see whether a new code is selected. If so, a new $F_i$ is obtained, the status display is updated, and a procedure returns to decision block 221. In the event that a new code has not been selected, the excess value is taken to decision block 221.

The portion of the procedure depending from decision block 221 provides the farebox with the flexibility of permitting one passenger to pay one or more fares for more than one passenger entitled to more than one category of fare. It is contemplated by the inventors that any excess value remaining after payment of all fares can be returned to passengers in the form of vouchers or receipts obtained from the driver.

Returning to the WAIT state, it should be evident that the procedure just described for fare payment in the form of coins or tokens is equally valid for payment in the form of bills or tickets. Thus, payment by bill or ticket will cause the procedure to exit from the WAIT state through an initial procedure section that transports the bill or ticket to be measured as described above, with the measurement being converted into a predetermined value. The bill is escrowed and displayed and the procedure enters decision block 220 to execute as described above for coins.

Figure 14:
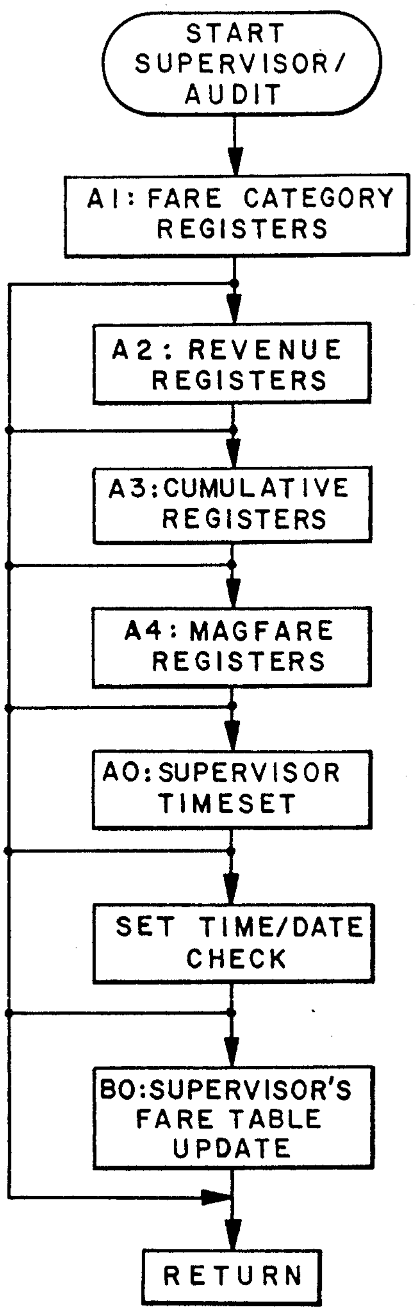
FIG. 14 is a flow chart illustrating an auditing process called by, the program of FIG. 11.

As stated above, the hopper 97 includes an electrostatic sensor, not shown, that detects and indicates to the fare processor the presence of a coin in the singulator mechanism 99. The fare processor also includes a software-implemented timer that is initiated by the COIN PRESENT signal provided by the sensor pair 95*a* and 95*b*. Each time the presence of a coin at the entrance to the singulator is indicated by the COIN PRESENT signal, the fare processor sets a software-implemented timer that times the length of the signal provided by the electrostatic sensor in the hopper 97. If the timer times out before the signal from the electrostatic sensor is gone, the fare processor determines that a coin is jammed in the singulator mechanism 99. Reference to FIG. 14 will provide an understanding of procedure implemented by the fare processor to unjam the singulator mechanism 99.

As shown in FIG. 14, the unjam procedure implemented by the fare processor 152 includes an initial WAIT state once it exits when a COIN PRESENT signal is received. After receipt of the COIN PRESENT signal, the fare processor starts the software-implemented timer timing and tests the signal received from the electrostatic sensor in the hopper 97 to see which expires first. In the event that the signal from the electrostatic sensor goes away before the timer times out, the fare processor takes the negative exit from the TIMEOUT UP and returns to the WAIT state. In the event that the timer times out before the electrostatic sensor signal goes away, the positive exit is taken.

Although not shown in the drawings, the coin singulator mechanism 99 has a conventional reversible drive that is controlled by a drive motor. When the positive exit is taken from the TIMEOUT UP decision block, the fare processor sends control signals to the coin module 21 that causes the coin singulator drive motor to completely cycle the singulator drive mechanism forward and reverse three times. All the time that the fare processor 152 is reciprocating the singulator mechanism drive motor, it monitors the signal provided by the electrostatic sensor in the hopper 97. In the event that the signal goes away, indicating that a coin or token is no longer in the singulator, the fare processor takes the negative exit from the SIGNAL PRESENT decision block 250 of FIG. 14 and returns to the WAIT state.

In the case that the electrostatic sensor signal indicates that a coin is still present in the singulator after three full cycles of reciprocation of the singulator mechanism by the fare processor, the positive exit is taken from the SIGNAL PRESENT decision block 250 and attempts three times to clear the jam by opening the hopper 97, checking for the signal from the electrostatic sensor (block 251), and, if the signal is present, reciprocating the singulator. This is done no more than three times. If the signal is present at decision block 250 after the third attempt, meaning the singulator is still jammed, the positive exit is taken from the decision block 252 and a code indicating a jam status of the singulator mechanism 99 is provided to the operator. At this point, the operator can operate the coin module 21 manually by pressing the override/bypass lever 41, which lifts the guide flange 97 off of the sloped ramped surface 96 and permits coins to drop directly down the sloped surface 96 into the portion of the coin module visible through the escrow window 23. This permits the operator to visually inspect each coin payment to determine whether it satisfies the fare requirement for a particular category or not. Assuming that the fare category is satisfied by the payment, the operator dumps the coins into the cashbox by operating the manual coin dump lever 39. It should be evident that manual operation of the coin module 21 will not permit the fare processor 152 to accumulate audit data regarding fare transactions paid for by coins or tokens.

In the event that the operator manages to clear a stuck coin or token from the singulator mechanism 99, for example by probing the mechanism or by pounding on the farebox, the unjam procedure provides for a manual restart of automatic operation of the coin module 21. In the event that a stuck coin is unjammed, the operator presses keys B and 3 on the keyboard 36, which, as explained below, calls up a set of diagnostic procedures implemented by the farebox. One of these procedures includes a single forward rotation of the singulator mechanism. Once that has been acomplished, the status display is provided with a code indicating the single forward rotation and the driver then presses the HOLD key on the keyboard 36. Depression of the HOLD key in this circumstance will cause the fare processor to do a single reverse rotation of the coin singulator mechanism 99 and to at the same time implement the SIGNAL PRESENT test described above. If the electrostatic sensor signal indicates a coin is still present the unjam procedure goes back to the INDICATE STATUS block described above and waits for either manual override or another attempt to manually restart the procedure. In the event that the negative exit is followed (electrostatic sensor signal goes away) then the fare processor prompts the driver, through an appropriate code on the status display 38, to press the DUMP key of the keyboard 36. Pressing the DUMP key will permit the fare processor 152 to operate the coin module 21 as described above to automatically accept and discriminate coins.

In the event that a passenger entering the bus provides a transfer or a prepaid pass to the driver, the driver will indicate the display of the pass by depressing the appropriate numerical code button on the keyboard 36. When this occurs, a value of 0 will be displayed on the passenger and driver value displays, the status display will display a code corresponding to the button pressed, the fare payment tone will issue, the appropriate audit registers will be updated, and the procedure will return to the WAIT state.

When fare processing is conducted by the magnetic farecard processor 154, the FIG. 12 procedure responds to a message from the farecard processor indicating the completion of a transaction and the statistics associated with that transaction. When the fare processor 152 receives such a message from the magnetic farecard processor 154, it updates the appropriate audit registers and returns to the WAIT state.

Figure 13:
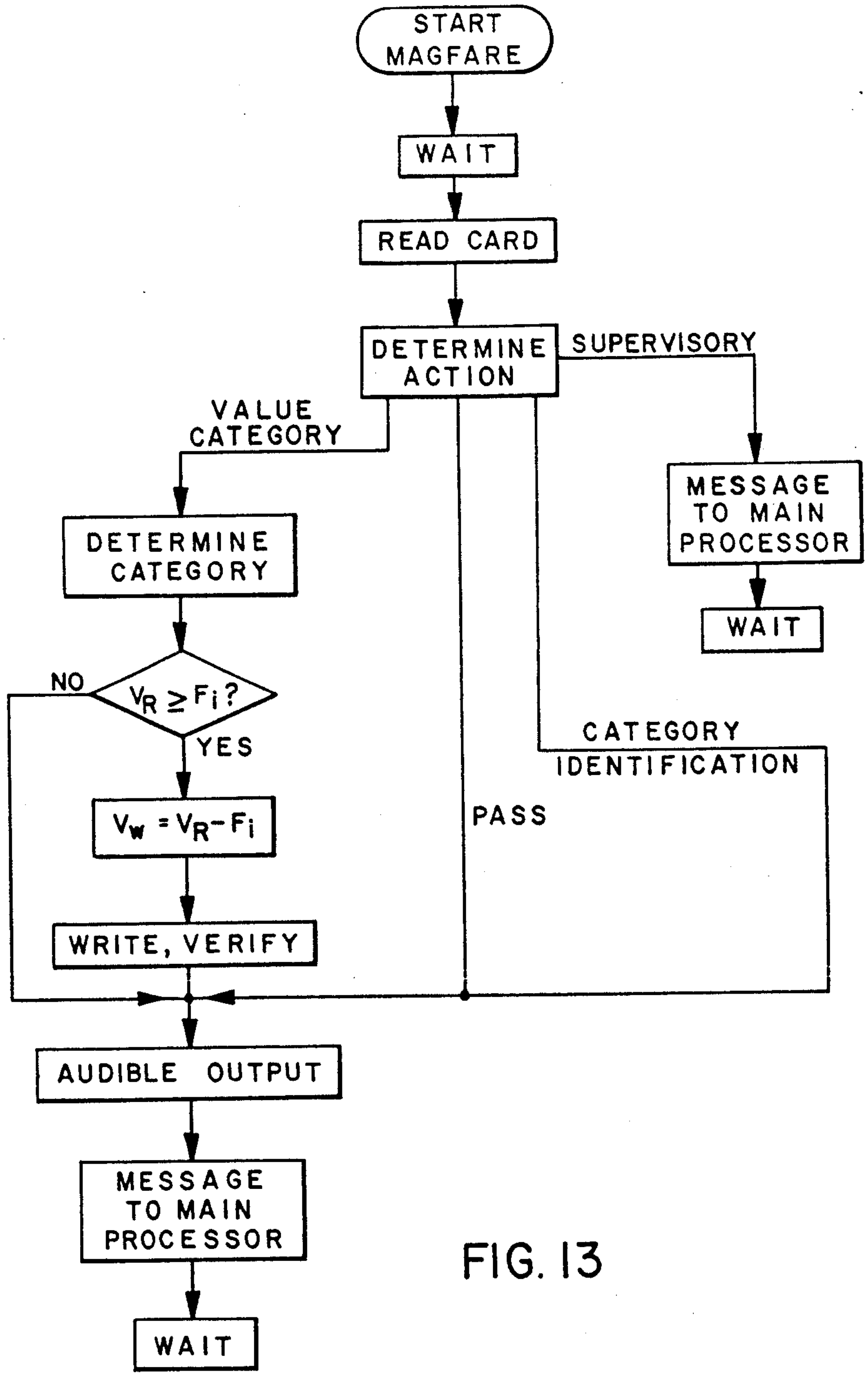
FIG. 13 is a flow diagram illustrating a magnetic farecard transaction process included in the fare processing process of FIG. 12.
Figure 16:
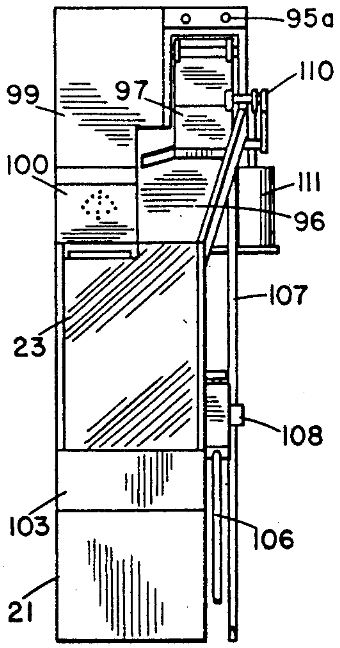
FIG. 16 is a front view of the coin module of FIG. 4.

FIG. 13 illustrates the procedure implemented by the magnetic farecard processor 154 in responding to cards swiped through the reader 27. As discussed above, the farecard may indicate supervisory personnel, in which case a message is sent to the fare processing unit identifying the card holder as an authorized person, and the procedure returns to the WAIT state.

In the event that the farecard is a revenue farecard with a prepaid value, the procedure of FIG. 13 will determine the fare category, determine whether the value remaining ($V_R$) on the card at least equals the category fare $F_i$. If $V_R$ equals or exceeds $F_i$, a value to be written ($V_w$) back onto the farecard is calculated by subtracting $F_i$ from $V_R$. Then the remaining value is written back to the card and verified, a voice message provided on the speaker 42, and a message registering the transaction and reporting its statistics is sent to the main fare processing unit. The program then enters the WAIT state.

In the event that the $V_R$ does not at least equal $F_i$, a message informing the passenger of that fact is provided, a message indicating a failed transaction is sent to the fare processing unit, and the WAIT state is entered.

When the magnetic farecard is used to indicate a prepaid unlimited pass or a fare category, the procedure of FIG. 13 provided an audible voice message confirming the pass or the category and sends an appropriate message to the fare processing unit 152.

The automatic farecard processor 154 of the farebox 10 includes an anti-passback feature that prevents a magnetic farecard in any but the supervisory or full fare revenue category from being used more than once within a predetermined period, for example, ten minutes. This will prevent the card being "passed back" to permit the entry of unauthorized passengers onto a bus. The anti-passback feature is implemented by providing a conventional circular register in the RAM of the magnetic fare processor unit 154. As each non-supervisory farecard is swiped through the reader 27, a unique identifying serial number imbedded in the card's fixed data field is entered into the register. The register is a first-infirst-out register through which entries are moved at the rate of the timeout period. Thus, after an entry has been in the register longer than ten minutes, it will be removed therefrom. As each farecard is swiped through the reader, its serial number is compared against all of the serial numbers in the register and if a match is found, the processing procedure is exited without conducting a fare transaction. Otherwise, the serial number is entered and the procedure executes normally. In both cases, an appropriate audible message is provided through the speaker 42.

The farebox 10 permits certain auditing and supervisory operations to be performed on the farebox through the keyboard 36. This is shown in FIG. 14. The fare processing block of FIG. 11 can be exited at any time by operating the keyboard 36 to initiate these functions. When the keys A and 1 are depressed, the operator is enabled to step through the fare category register of the current audit block by sequentially depressing any key on the keyboard save the DUMP key. Keys A and 2 access audit block registers containing the accumulated revenue run, number of bills, number of tokens, and number of coins. The keys A and 4 access the magnetic farecard registers. When the keys A and 0 are depressed, the fare processing unit program determines whether a supervisor's card has been swiped in the reader 27 or an access code entered through the keyboard, if not, the procedure is exited. If the proper card has been swiped or code entered, the supervisor is enabled to reset the time/date clock 184. The keys B and 0 together with the supervisor's card or access code permit the supervisor to select fare tables and alter fare table data through an interactive keyboard entry procedure during which the supervisor selects a fare table and alters its contents in response to a series of prompts on the status display 38.

Returning to the keyboard 36 illustrated in FIG. 9, the DUMP key permits a driver to override the software-implemented timeout clock and to dump bills from under the bill escrow window 23. The dump key is also used to exit the audit and supervisory routines of FIG. 14.

The HOLD key on the keyboard 36 stops the software-implemented timeout and retains coins or bills under their respective escrow windows. The HOLD key also retains on the status display, the status of the current (suspends) magnetic fare processor transaction, without suspending magnetic farecard operation. In a keyboard routine such as a register audit, the HOLD key is used to advance through the routine.

Figure 15:
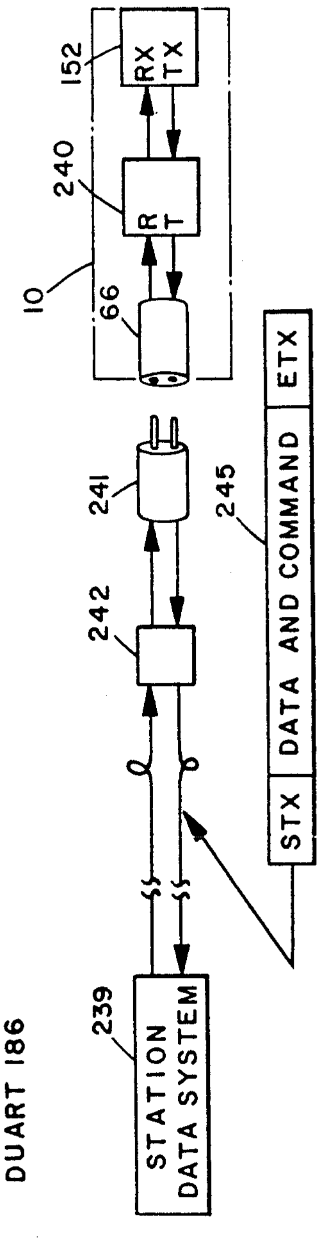
FIG. 15 is a block diagram illustrating the interconnection of the farebox of the invention with a station communication system.

Farebox functions are terminated when the bus containing the farebox is driven to a transit station where a transit station data system 23 is available. Reference to FIG. 15 will provide an understanding of station procedures implemented by the farebox 10. Communication with the station data system is implemented by way of the station communication probe receptacle 66 mounted on the farebox which provides half-duplex communication between itself and a conventional optical isolator 240, which is connected to the $T_{XA}$ and $R_{XA}$ terminals of the DUART 186 of FIG. 7. In the station the station data communication system will access the farebox by a probe 241 that is received by the probe receptacle 66. The probe is manually inserted into the receptacle 66 and is electrically isolated by another optical isolator 242 corresponding essentially to the isolator 240

Once the probe 241 is received in the receptacle 66, communications between the station system 239 and the farebox 10 are conducted in standard asynchronous, half duplex fashion using a multi-byte protocol with a message structure indicated by 245 in FIG. 15. In the message structure, STX indicates start of text for multibyte transmission. The end of the message is indicated by the ETX field. Between the STX and ETX fields, the message is conventionally structured to provide command and data information. One field permits the identification of a command.

In the preferred embodiment of the invention, an AUDIT command indicated in the command field of a message transmitted from the station data system 239 to the farebox 10 causes the farebox 10 to transmit to the station data system the contents of all of its audit block registers. In the audit data transfer procedure from the farebox to the station data system, the farebox 10 clears all of the current run audit registers in the RAM 180 after a cashbox cycle, described below.

The second command of interest consists of an UNLOCK command transmitted from the station data system to the farebox 10 that contains a code in the data and command fields of the message that is recognized by the farebox fare processor 152 as enabling it to operate the electronic lock 60 to withdraw the tang 145 from the slot 147 in the top of the cashbox 46. This permits the cashbox to be removed by rotating the manual lock 64 to its closed position which closes the apertures on the top of the cashbox 46 and retracts the locking tang 139 into the cashbox. A cashbox cycle is completed when the cashbox is reinserted into the lower chamber and seated as described above. When the farebox processor detects seating of the cashbox, it clears the run audit registers.

A third command of interest consists of a FARE TABLE UPDATE message transmitted from the station data system to the farebox 10 that prompts the fare processor unit 152 to replace the fare table data in the RAM 180 with updated fare table information provided in the data field of the message.

Finally, a fourth message of interest contains a TIME/CLOCK UPDATE command accompanied by current time/date data that prompts the fare processor 152 to reset the time/date clock 184.

Obviously many modifications and variations of the above-described farebox are possible in light of the foregoing teachings, and it is therefore understood that the invention may be practiced otherwise than as specifically described.

We claim:

1. A transit vehicle farebox for conducting transit fare transactions by accepting a plurality of payment media, comprising:

a housing having a first aperture for receiving paper payment media and a second aperture for receiving coin payment media;

bill means removably seated in a first part of said housing for feeding a paper bill having a predetermined length from said first aperture to a bill collection point within said housing while detecting said predetermined length;

coin means for feeding a coin having a predetermined denomination from said second aperture to a coin collection point while detecting said predetermined denomination;

farecard means mounted on said housing for receiving fare media bearing encoded data signals while detecting predetermined fare information in said data signals;

fare category means for generating a fare category signal indicative of passenger fare category;

a fare table for tabularizing a plurality of predetermined fares in association with a plurality of respective passenger fare categories and for selecting a fare to be charged in response to said fare category signal;

fare processing means connected to said bill means, said coin means, said farecard means, said fare category means, and said fare table means for registering payment of said selected fare based upon a detected bill length, a detected coin denomination, or detected fare information;

first means in said processing means for obtaining value from said bill length, said denomination, or said fare information;

second means in said processing means and connected to said first means for determining fare payment by comparing said value with a selected fare;

portable cashbox means removably held in a second part of said housing adjacent said bill and said coin collection points for securely receiving coins and bills from said bill means and coin means;

a fixed barrier separating said first and second parts of the housing;

said bill and coin collection points comprising passageway means in said fixed barrier connecting said first part of the housing to said cashbox means in said second part of the housing;

locking means in said first part of the housing for blocking access to coins and bills received by said cashbox through said passageway means in response to removal of said bill means from said housing.

2. The farebox of claim 1 further including in said processing means audit means for accumulating audit data based upon a plurality of fare registered by said fare processing means.

3. The farebox of claim 1 further including sensor means connected to said processing means for detecting when said cashbox occupies a predetermined security location in said housing; and security means in said processing means for, until said cashbox is in said security location, preventing said farecard processor from detecting fare information, preventing said bill means from feeding a farebill and detecting a bill length, and preventing said coin means from feeding a coin and detecting a coin denomination.

4. The farebox of claim 3 further including electronic lock means connected to said processing means for, in response to a first lock state signal, assuming a first state securing said cashbox at said security location or, in response to a second lock state signal, assuming a second state releasing said cashbox from said security location and lock control means connected to said electronic lock means for providing said first or said second lock state signal.

5. The farebox of claim 4 wherein said lock control means includes lock code means in said processing means for providing said second lock state signal in response to a lock code received from a code source.

6. The farebox of claim 5 further including in said processing means audit means for accumulating audit data based upon a plurality of fare registered by said fare processing means.

7. The farebox of claim 6 further including station interface means connected to said processing means for receiving a station communications means and providing a communications link between said station communications means and said processing means.

8. The farebox of claim 7 wherein said processing means provides said accumulated audit data from said audit means in response to a first predetermined communication signal provided by a station communications means through said station interface means.

9. The farebox of claim 7 wherein said lock code means provides said second lock state signal in response to a second predetermined communication signal provided by a station communications means through said station interface means and indicating said lock code.

10. A multi fare media farebox, comprising:

a housing with upper and lower portions and a fixed barrier separating said upper and lower portions, said barrier including passageway means for connecting said upper and lower portions;

bill means removably seated in said upper portion for receiving and determining the denomination of a currency bill or fare ticket and for conveying currency bills and fare tickets to said passageway means;

coin means in said upper portion for receiving and determining the denomination of a coin or token and for conveying coins and tokens to said passageway means;

magnetic farecard processor means in said upper portion for receiving a magnetically encoded farecard and recognizing fare information encoded thereon;

portable cashbox means releasably held in said lower portion and communicating with said passageway means for receiving currency bills, fare tickets, coins or tokens therefrom;

security means in said housing upper portion for blocking said passageway means to restrict unauthorized access to said lower portion in response to removal of said bill means from said housing upper portion; and fare processing means in said housing for determining payment of a fare based upon determination of the denomination of a currency bill, fare ticket, coin, or token or recognition of predetermined encoded fare information.

11. The farebox of claim 10 further including fare table means in said fare processing means for associating a predetermined fare amount with a predetermined fare category, manually operable means on said farebox for indicating a fare category selection, and fare procedure means in said fare processing means for determining payment of a category fare further based upon a fare category indicated by said manually operable means.

12. The farebox of claim 11 wherein said fare table means includes a plurality of fare tables, each associating a respective fare amount with said fare category, in response to a fare table selection indicated by said manually operable means, and said fare procedure means further determines said payment based upon a fare table indicated by said manually operable means.

13. The farebox of claim 12 including means in said magnetic farecard processing means for receiving from said fare processing means a selected fare table and for determining payment of a fare based upon recognition of a prepaid fare value and a fare category contained in said encoded fare information and upon a fare value associated with said fare category by said received fare table.

14. The farebox of claim 11 wherein said magnetic farecard processing means is further for recognizing a fare category contained in said encoded fare information and said fare procedure means includes means for receiving an indication of a fare category from said magnetic farecard processing means.

15. The farebox of claim 10 further including audit means, in said fare processing means, for accumulating statistics based upon a plurality of fare payment determinations and means for retrieving said accumulated statistics from said fare processing means.

16. The farebox of claim 10 further including interlock means for detecting when said portable cashbox means occupies a predetermined secured position in said lower portion whereat said cashbox means is enabled to receive cash bills, fare tickets, coins, or tokens from said bill and said coin modules and locking means in said farebox for locking said cashbox means into said lower portion when said occupation is detected.

17. The farebox of claim 13 in combination with unlocking means receivable by said farebox for unlocking said cashbox means from said lower portion.

18. The farebox of claim 16 in combination with a station communication means for providing an encoded unlocking signal and a probe means connected to said station communication means and receivable by said farebox for communicating said unlocking signal to said locking means and wherein said locking means is responsive to said unlocking signal for unlocking said cashbox means from said lower portion.

19. The farebox of claim 1 wherein said coin means includes a coin singulator mechanism for receiving and serializing coins received through said second aperture and said fare processing means includes unjam means controlling said coin singulator mechanism for detecting when said coin singulator mechanism is jammed by coin or token and for operating said coin singulator mechanism to unjam a jammed coin or token.

* * * * *

UNITED STATES PATENT AND TRADEMARK OFFICE
CERTIFICATE OF CORRECTION

PATENT NO. : 4,977,502

DATED : December 11, 1990

INVENTOR(S) : Joseph R. Baker, et al.

It is certified that error appears in the above-identified patent and that said Letters Patent is hereby corrected as shown below:

Title page:

The title should read --MULTIMEDIA SYSTEM FOR USE IN TRANSIT VEHICLES INCLUDING FAREBOX MEANS WITH PLURAL FARE CATEGORIES AND SECURITY MEANS TO RESTRICT UNAUTHORIZED ACCESS TO THE FAREBOX--

The Assignee's name was omitted and should read

--CUBIC WESTERN DATA--

Signed and Sealed this

Twenty-ninth Day of September, 1992

*Attest:*

DOUGLAS B. COMER

*Attesting Officer*

*Acting Commissioner of Patents and Trademarks*